(12) United States Patent
Yeun

(10) Patent No.: US 10,088,557 B2
(45) Date of Patent: Oct. 2, 2018

(54) LIDAR APPARATUS

(71) Applicant: MSOTEK Co., Ltd, Daejeon (KR)

(72) Inventor: Yong Hyun Yeun, Daejeon (KR)

(73) Assignee: MSOTEK Co., Ltd, Daejeon (KR)

( * ) Notice: Subject to any disclaimer, the term of this patent is extended or adjusted under 35 U.S.C. 154(b) by 346 days.

(21) Appl. No.: 14/994,528

(22) Filed: Jan. 13, 2016

(65) Prior Publication Data

US 2016/0274222 A1 Sep. 22, 2016

(30) Foreign Application Priority Data

Mar. 20, 2015 (KR) .......................... 10-2015-0039267
Mar. 23, 2015 (KR) .......................... 10-2015-0039889

(51) Int. Cl.
G01S 7/48 (2006.01)
G01S 7/481 (2006.01)
G01S 17/10 (2006.01)
G01S 17/42 (2006.01)
G01S 17/89 (2006.01)
G01S 7/486 (2006.01)

(52) U.S. Cl.
CPC .......... G01S 7/4817 (2013.01); G01S 7/4812 (2013.01); G01S 7/4816 (2013.01); G01S 17/10 (2013.01); G01S 17/42 (2013.01); G01S 17/89 (2013.01); G01S 7/4863 (2013.01)

(58) Field of Classification Search
CPC .... G01S 7/4812; G01S 7/4813; G01S 7/4817; G01S 17/42; G02B 26/0816
See application file for complete search history.

(56) References Cited

U.S. PATENT DOCUMENTS

| 7,944,548 | B2 | 5/2011 | Eaton | |
|---|---|---|---|---|
| 8,836,922 | B1 | 9/2014 | Pennecot et al. | |
| 2007/0159189 | A1 | 7/2007 | Cho et al. | |
| 2008/0316463 | A1* | 12/2008 | Okada | G01S 7/4812 356/4.01 |
| 2011/0216304 | A1 | 9/2011 | Hall | |
| 2012/0170029 | A1 | 7/2012 | Azzazy et al. | |
| 2012/0249996 | A1* | 10/2012 | Tanaka | G01S 7/4817 356/4.01 |
| 2014/0049783 | A1* | 2/2014 | Royo Royo | G01S 7/4816 356/601 |
| 2014/0293263 | A1 | 10/2014 | Justice et al. | |

FOREIGN PATENT DOCUMENTS

| JP | 2007240516 A | 9/2007 |
|---|---|---|
| KR | 100337011 B1 | 5/2002 |
| KR | 100682955 B1 | 2/2007 |

* cited by examiner

*Primary Examiner* — Luke D Ratcliffe

(74) *Attorney, Agent, or Firm* — The Webb Law Firm

(57) ABSTRACT

Provided is a LIDAR apparatus of emitting laser beam in a scanning scheme in each direction within a field of view and separately obtaining reflected light in each direction to calculate a distance up to a reflector. The LIDAR apparatus may rapidly and efficiently perform scanning, may be compact, may significantly decrease a required laser output as compared with an apparatus according to the related art simultaneously emitting laser in all directions within the field of view, may be manufactured at a low cost, and may be operated at a low cost.

36 Claims, 22 Drawing Sheets

LIDAR APPARATUS

CROSS-REFERENCE TO RELATED APPLICATIONS

This application claims priority to Korean Patent Applications Nos. 10-2015-0039267 and 10-2015-0039889, filed Mar. 20, 2015 and Mar. 23, 2015, respectively, the disclosures of which are hereby incorporated in their entirety by reference.

TECHNICAL FIELD

The following disclosure relates to a measuring apparatus. More particularly, the following disclosure relates to an apparatus of measuring a distance up to a target to be measured and a form of the target to be measured using an optical means.

BACKGROUND

Light detection and ranging (LIDAR) indicates detecting a target and measuring a distance to the target using light. The LIDAR is similar in function to radio detection and ranging (RADAR), but is different from the RADAR using a radio wave in that it uses the light. For this reason, the LIDAR is also called 'image RADAR'. Due to a Doppler effect difference between the light and a microwave, the LIDAR has bearing resolution, range resolution, and the like, more excellent than those of the RADAR.

As a LIDAR apparatus, an airborne LIDAR apparatus of emitting a laser pulse in a satellite or an aircraft and receiving a pulse back-scattered by particles in the atmosphere in a ground observation post has been mainly used. The airborne LIDAR apparatus has been used to measure existence and movement of dust, smoke, aerosol, cloud particles, and the like, together with wind information and analyze distribution of dust particles in the atmosphere or a degree of air pollution. Meanwhile, recently, a terrestrial LIDAR apparatus serving to detect an obstacle, model a terrain, and obtain a position up to a target by installing both of a transmitting system and a receiving system on the ground has been actively studied in consideration of application to a national defense field such as a surveillance patrol robot, a battle robot, an unmanned surface vehicle, an unmanned helicopter, or the like, or a civilian field such as a civilian mobile robot, a smart vehicle, an unmanned vehicle, or the like.

The terrestrial LIDAR apparatus is generally configured to include a transmitting optical system emitting a laser pulse, a receiving optical system receiving reflected light reflected by an external object, and an analyzing unit determining a position of the object. Here, the analyzing unit determines a time required for transmission and reception of the reflected light to calculate a distance up to the object reflecting the light, and calculate distances with respect to reflected light received particularly in each direction, thereby making it possible to create a distance map within an image corresponding to a field of view (FOV).

However, since the terrestrial LIDAR apparatus according to the related art emits laser of which a beam width corresponding to the field of view is wide and obtains the reflected light simultaneously in all directions within the field of view to obtain a distance up to a reflector, the terrestrial LIDAR apparatus according to the related art requires a laser module having a very high output, such that a cost thereof is very expensive. In addition, the laser module having the high output has a large size, which causes an increase in an entire size of the LIDAR apparatus.

Particularly, a LADAR apparatus having a panoramic scanning function includes a transmitting optical system and a receiving optical system, such that the entire apparatus is rotated and operated. Examples of this apparatus have been disclosed in U.S. Patent Application Publication Nos. 2011/0216304, 2012/0170029, and 2014/0293263, and U.S. Pat. No. 8,836,922. However, in the case of rotating the entire apparatus as described above, a size of a system is further increased, which is not good in terms of aesthetics and further intensifies an increase in a cost and power consumption.

SUMMARY

An embodiment of the present invention is directed to providing a light detection and ranging (LIDAR) apparatus capable of rapidly and efficiently performing scanning, significantly decreasing a required laser output, having a compact size, and decreasing a manufacturing cost and an operation cost by emitting a laser beam in a scanning scheme in each direction within a field of view and separately obtaining reflected light in each direction to calculate a distance up to a reflector.

A LIDAR apparatus according to the present invention for accomplishing the above technical object may be installed above a fixed body such as a military checkpoint or above a mobile body such as a robot, a vehicle, or the like, and be used to detect a target present in the vicinity thereof and obtain a distance up to the detected target.

To this end, the LIDAR apparatus according to the present invention includes a light source, a rotation mirror, a reception mirror, a light detecting unit, and a calculating unit. The light source generates source light. The rotation mirror is rotatably installed in a two-axis direction on a light path of the source light, such that a direction of a reflection surface thereof is varied depending on time, and reflects the source light as scan light forward while changing a direction depending on time. The reception mirror is installed in front of the rotation mirror, reflects received light, which is the scan light reflected by an external reflector to thereby be returned, and has a light transmitting part formed at a position facing the rotation mirror so that light paths of the source light incident to the rotation mirror and the scan light emitted from the rotation mirror are not blocked. The light detecting unit detects the received light reflected by the reception mirror. The calculating unit calculates a distance up to the external reflector on the basis of a time of flight from a point in time in which the source light is generated to a point in time in which the received light is detected.

In a preferable exemplary embodiment, the LIDAR apparatus further includes a wide angle lens installed on a movement path of the scan light and extending an angle at which the scan light is emitted.

In an exemplary embodiment, the LIDAR apparatus further includes a condensing lens condensing the received light reflected by the reception mirror, wherein the light detecting unit detects the received light condensed by the condensing lens. In addition, the LIDAR apparatus may further include a light source mirror reflecting the source light emitted from the light source toward the rotation mirror.

In another exemplary embodiment, the LIDAR apparatus further includes a concave mirror condensing the received light reflected by the reception mirror, wherein the light detecting unit detects the received light condensed by the concave mirror. It is preferable that the LIDAR apparatus according to the exemplary embodiment as described above further includes a detector mirror reflecting the received light condensed by the concave mirror toward the light detecting unit. In addition, the LIDAR apparatus may further include a light source mirror reflecting the source light emitted from the light source toward the rotation mirror. In this case, it is preferable that the detector mirror and the light source mirror are integrated with each other while having reflection surfaces in different directions.

In still another exemplary embodiment, the LIDAR apparatus further includes a prism having an inclined surface, a first side surface disposed toward the front, and a second side surface orthogonal to the first side surface, and including a light injecting part formed on the inclined surface and having a source incident surface that is in parallel with the first side surface. In this case, the rotation mirror is disposed outside the source incident surface, and an inner side surface of the inclined surface acts as the reception mirror. In a preferable exemplary embodiment, the light injecting part of the prism is formed of a protrusion part protruding outward from the inclined surface or a groove depressed from the inclined surface into the prism.

Alternatively, the LIDAR apparatus according to the present invention includes a light source, a rotation mirror, an upper mirror, a light detecting unit, a reception mirror, and a calculating unit. The light source generates source light. The rotation mirror is rotatably installed in a two-axis direction on a light path of the source light, such that a direction of a reflection surface thereof is varied depending on time, and reflects the source light as scan light upward while changing a direction depending on time. The upper mirror is installed above the rotation mirror, reflects the scan light in a lateral downward direction, and reflects received light, which is the scan light reflected by an external reflector to thereby be returned, in a downward direction. The light detecting unit detects the received light. The reception mirror is installed in front of the rotation mirror, reflects the received light reflected by the upper mirror toward the light detecting unit, and has a light transmitting part formed at a position facing the rotation mirror so that light paths of the source light incident to the rotation mirror and the scan light emitted from the rotation mirror are not blocked. The calculating unit calculates a distance up to the external reflector on the basis of a time of flight from a point in time in which the source light is generated to a point in time in which the received light is detected.

In an exemplary embodiment, the LIDAR apparatus further includes a condensing lens condensing the received light reflected by the reception mirror, wherein the light detecting unit detects the received light condensed by the condensing lens. In addition, it is preferable that the LIDAR apparatus further includes a light source mirror reflecting the source light emitted from the light source toward the rotation mirror.

In another exemplary embodiment, the LIDAR apparatus further includes a concave mirror condensing the received light reflected by the reception mirror, wherein the light detecting unit detects the received light condensed by the concave mirror. It is preferable that the LIDAR apparatus according to the exemplary embodiment as described above further includes a detector mirror reflecting the received light condensed by the concave mirror toward the light detecting unit. In addition, it is preferable that the LIDAR apparatus further includes a light source mirror reflecting the source light emitted from the light source toward the rotation mirror. In this case, it is preferable that the detector mirror and the light source mirror are integrated with each other while having reflection surfaces in different directions.

In still another exemplary embodiment, the LIDAR apparatus further includes a prism having an inclined surface, a first side surface disposed toward the upper mirror, and a second side surface orthogonal to the first side surface, and including a light injecting part formed on the inclined surface and having a source incident surface that is in parallel with the first side surface. In this case, the rotation mirror is disposed outside the source incident surface, and an inner side surface of the inclined surface acts as the reception mirror. In a preferable exemplary embodiment, the light injecting part of the prism is formed of a protrusion part protruding outward from the inclined surface or a groove depressed from the inclined surface into the prism.

It is preferable that the upper mirror is a mirror having a cone shape of which a vertex is positioned at a lower portion, or a convex mirror of which a reflection surface is convex downward.

The upper mirror may have a symmetrical shape so as to have the same reflection angle characteristics in all horizontal directions or have an asymmetrical shape so as to have different reflection angle characteristics in at least some of all horizontal directions.

BRIEF DESCRIPTION OF THE DRAWINGS

Hereinafter, exemplary embodiments of the present invention will be described with reference to the accompanying drawings. Through the accompanying drawings, the same or corresponding members will be denoted by the same reference numerals.

DETAILED DESCRIPTION OF MAIN ELEMENTS

Figure 1:
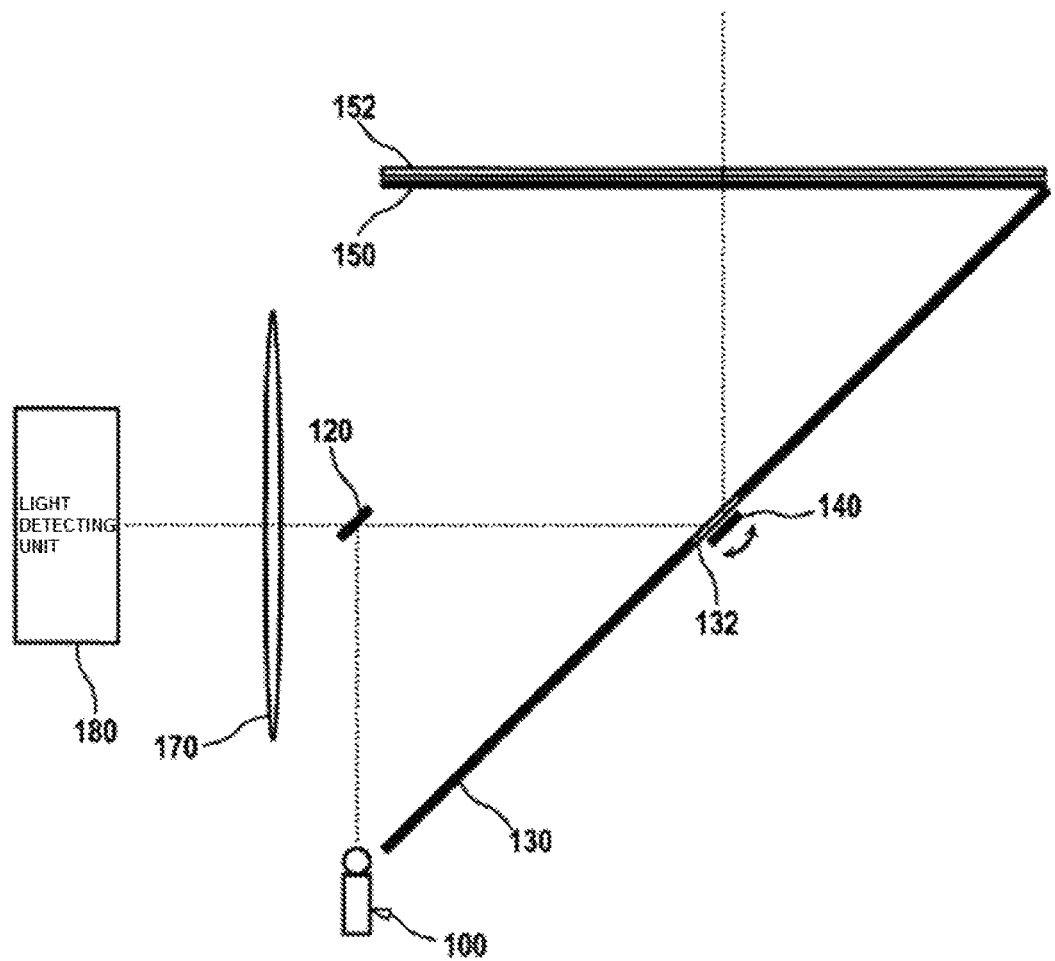
FIG. 1 is a view illustrating a configuration of a transmitting and receiving optical system of a light detection and ranging (LIDAR) apparatus according to a first exemplary embodiment of the present invention.

100: light source
120: light source mirror
130: reception mirror    132: through-hole
140: micro mirror
150: wide angle lens
152: filter
160: upper mirror
170: condensing lens
180: light detecting unit
360: concave reflection mirror    362: detector mirror
400, 400a, 440, 460: prism
402: inclined surface    404, 444: first side surface    406, 466: second side surface
410: protrusion part    412: source incident surface    414: vertical surface
420: groove    422: source incident surface    424: vertical surface

DETAILED DESCRIPTION OF EMBODIMENTS

Referring to FIG. 1, a light detection and ranging (LIDAR) apparatus according to a first exemplary embodiment of the present invention includes a light source 100, a light source mirror 120 disposed above the light source 100 in FIG. 1, a reception mirror 130 and a micro mirror 140 disposed in a lateral direction of the light source mirror 120, and a condensing lens 170 and a light detecting unit 180 positioned at an opposite side to the reception mirror 130 in relation to the light source mirror 120.

The light source 100 generates and emits source laser light (hereinafter, referred to as 'source light') for scanning a distance measurement target. It is preferable that the source light is pulse laser. The light source mirror 120 has a quadrangular shape or a circular shape, and reflects the source light emitted from the light source 100 toward the micro mirror 140.

The micro mirror 140 re-reflects the source light reflected by the light source mirror 120 to allow the re-reflected laser light (hereinafter, referred to as 'scan light') to move in a forward direction (an upward direction in FIG. 1) of the apparatus. The micro mirror 140 may be configured to rotate in left and right directions and upward and downward directions in relation to a front surface thereof, repeat an operation in which it periodically moves in the upward and downward directions and then returns to the upward direction, and rotate multiple times in the left and right directions in a period in which a direction of the micro mirror 140 is changed once from the upward direction to the downward direction. Therefore, the light reflected by the micro mirror 140 is scanned in each direction within a field of view in a predetermined pattern, and the scan light emitted from the LIDAR apparatus may be periodically scanned in the forward direction in a range of the field of view.

The micro mirror 140 is, preferably, a micro electro mechanical systems (MEMS) mirror in which a mirror is installed on a MEMS semiconductor, but is not limited thereto. The MEMS mirror is illustrated in detail in the drawings of Korean Patent Publication No. 10-0682955 as an example, and those skilled in the art to which the present invention pertains may easily implement the MEMS mirror on the basis of the present specification. Therefore, a detailed description for the MEMS mirror will be omitted.

The reception mirror 130 reflects received light, which is the scan light emitted from the LIDAR apparatus, reflected or scattered (hereinafter, simply referred to as 'reflected') by an external reflector, and then returned, toward the light detecting unit 180. The reception mirror 130 has a quadrangular shape or a circular shape, and includes a through-hole 132 formed at approximately the center thereof. The micro mirror 140 may be installed behind the through-hole 132 of the reception mirror 130 to allow the source light incident to the micro mirror 140 and the scan light emitted from the micro mirror 140 to move while penetrating through the through-hole 132. That is, the reception mirror 130 allows light paths of the source light and the scan light not to be blocked while reflecting the received light toward the light detecting unit 180.

In a preferable exemplary embodiment, a wide angle lens 150 and a filter 152 may be additionally provided in front of an assembly of the reception mirror 130 and the micro mirror 140, that is, on a movement path of the scan light. The wide angle lens 150 extends an angle at which the scan light emits, thereby widening a field of view. The filter 152 passes only light in a wavelength band generated by the light source 100 therethrough to prevent light in another band from being mixed with the light in the wavelength band generated by the light source 100 as noise, blocks foreign materials such as water, dust, or the like, from being introduced to protect an inner portion of the LIDAR apparatus, and prevents the scan light and the received light from being reflected by the wide angle lens 150. The filter 152 may be implemented as a coating for the wide angle lens 150.

The condensing lens 170 condenses the received light refracted by the wide angle lens 150 and reflected by the reception mirror 130. The light detecting unit 180 detects the condensed received light. As the light detecting unit 180, for example, one or more avalanche photodiode (APD) arrays may be used.

In the LIDAR apparatus according to the present exemplary embodiment, transmitted light and received light move as follows.

Figure 2:
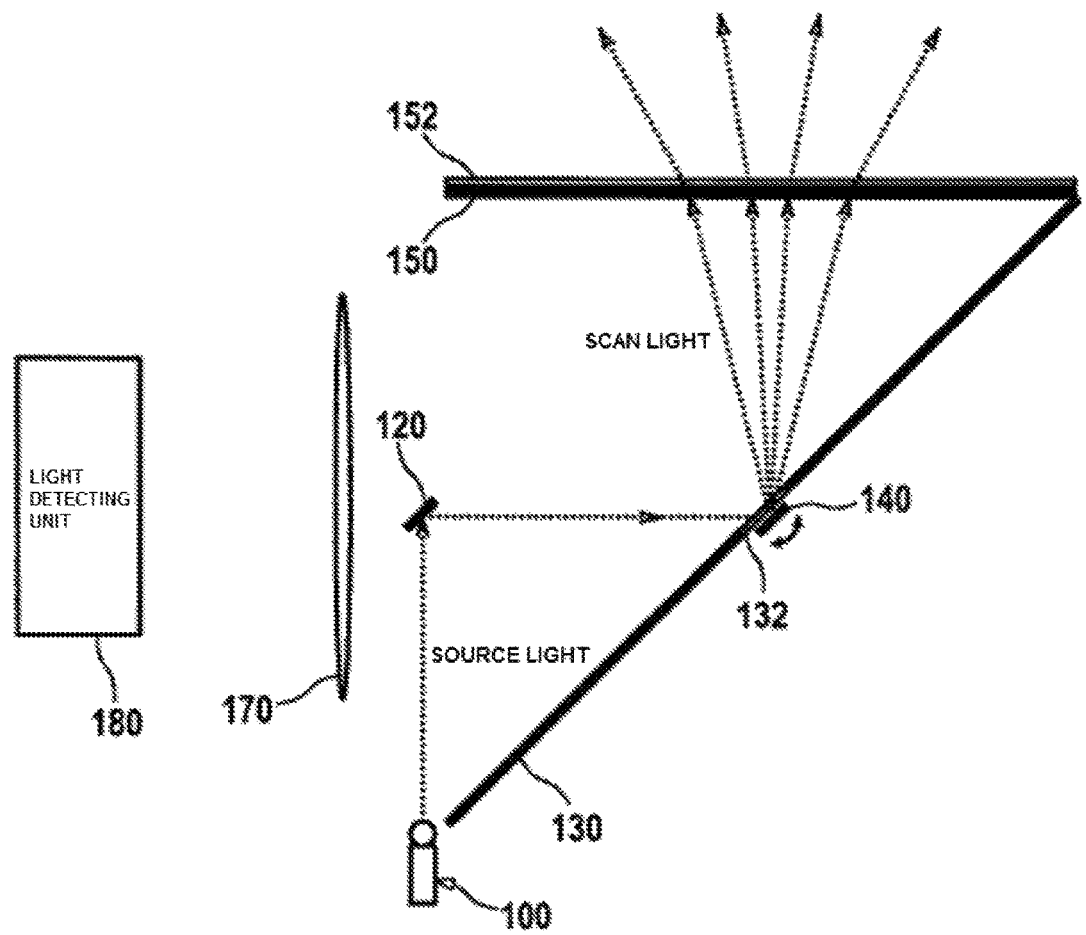
FIG. 2 is a view illustrating a light path of transmitted light in the LIDAR apparatus of FIG. 1.

As illustrated in FIG. 2, the source light emitted from the light source 100 is reflected by the light source mirror 120 and is incident to the micro mirror 140. The source light is re-reflected by the micro mirror 140 that rotates, and is then refracted by the wide angle lens 150. The scan light refracted by the wide angle lens 150 moves in the forward direction of the apparatus in which the external reflector, that is, a detection target may be present.

Figure 3:
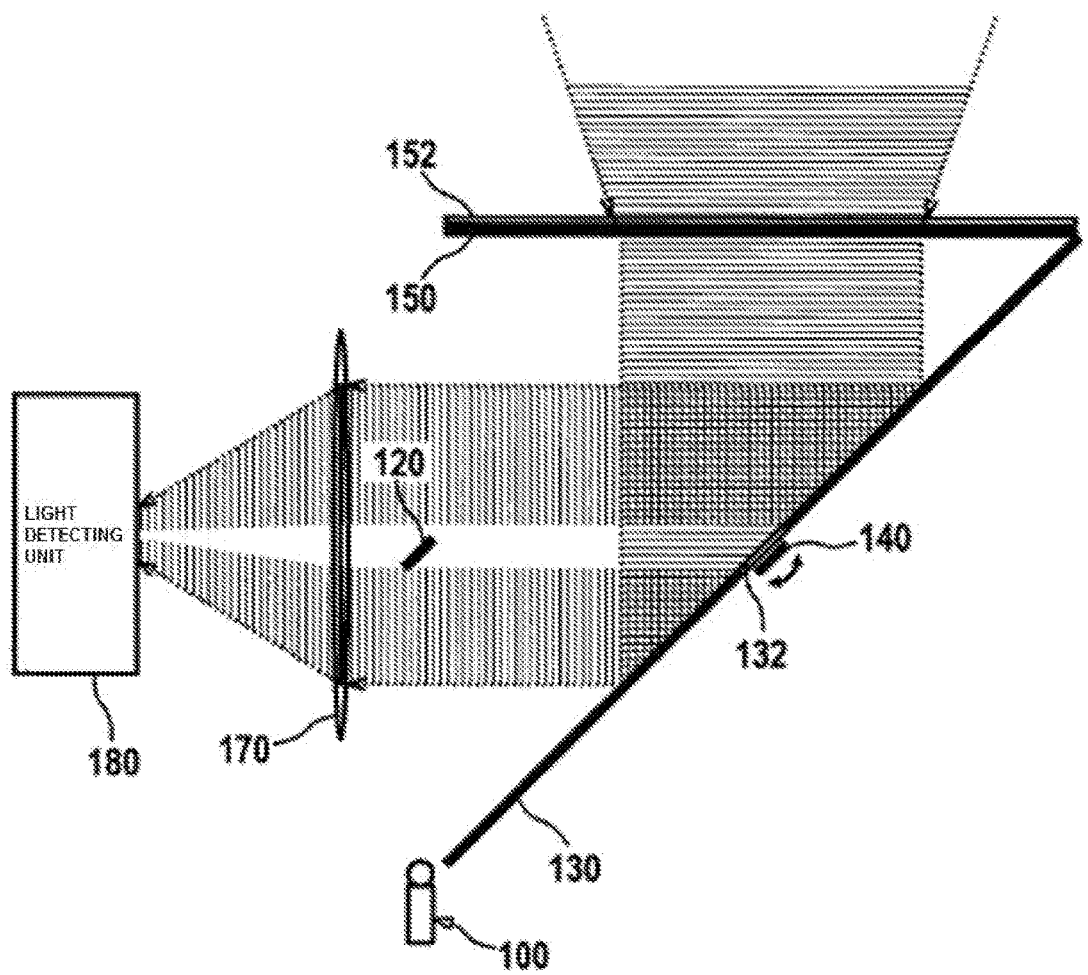
FIG. 3 is a view illustrating a light path of received light in the LIDAR apparatus of FIG. 1.

Meanwhile, as illustrated in FIG. 3, the received light reflected by the external reflector and then returned is refracted by the wide angle lens 150 and is then incident to the reception mirror 130. The received light reflected by the reception mirror 130 is condensed by the condensing lens 170 and is then converted into an electrical signal by the light detecting unit 180.

Figure 4:
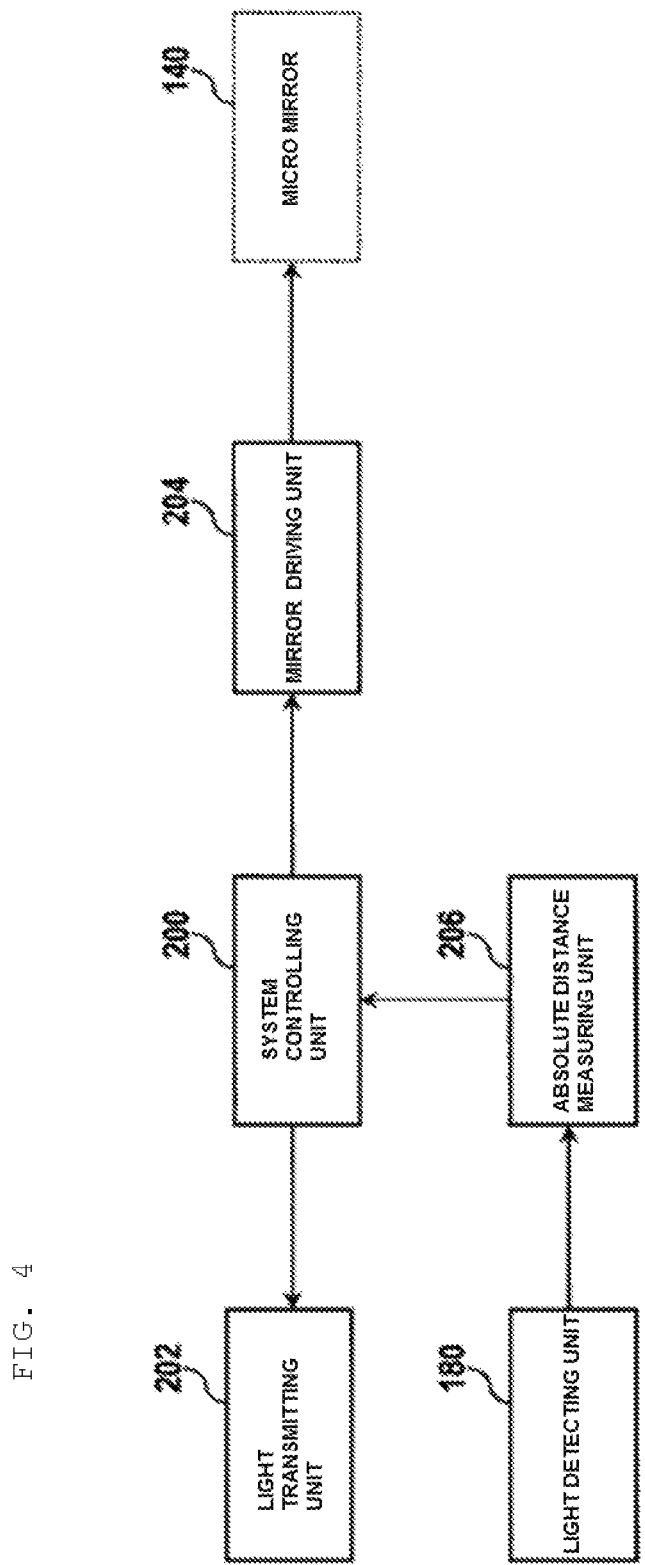
FIG. 4 is a block diagram illustrating electrical components of the LIDAR apparatus of FIG. 1.

FIG. 4 illustrates electrical components of the LIDAR apparatus illustrated in FIG. 1. The LIDAR apparatus electrically includes a system controlling unit 200, a light transmitting unit 202, a mirror driving unit 204, the light detecting unit 180, and an absolute distance measuring unit 206.

The system controlling unit 200 controls a general operation of the LIDAR apparatus.

The light transmitting unit 202 includes the light source 100 illustrated in FIG. 1 to generate source laser light under a control of the system controlling unit 200, and outputs the generated source laser light through an optical system illustrated in FIG. 1.

The mirror driving unit 204 generates and outputs a mirror driving signal for driving horizontal rotation and vertical rotation of the micro mirror 140 under a control of the system controlling unit 200. In a preferable exemplary example, information on a horizontal rotation amount and a vertical rotation amount of the micro mirror 140 depending on the mirror driving signal is stored in a lookup table (not illustrated), and the mirror driving unit 204 generates the mirror driving signal on the basis of the information stored in the lookup table with reference to scan region range information pre-set in the system controlling unit 200 depending on an application field. The scan region range information may also be changed depending on setting of a user.

The light detecting unit 180 detects the received light condensed by the condensing lens 170, as described above. The absolute distance measuring unit 206 calculates a distance up to the reflector on the basis of a time of flight (TOF) of an optical signal, that is, a time from a point in time in which the source light is generated by the light transmitting unit 202 to a point in time in which the received light is detected by the light detecting unit 180. As described above, in a preferable exemplary embodiment, the light detecting unit 180 is implemented using the APD array including a plurality of APDs. In this exemplary embodiment, the absolute distance measuring unit 206 calculates the distance up to the reflector in each APD unit. Particularly, in a preferable exemplary embodiment, the absolute distance measuring unit 206 configures a distance map image in which the distance calculated for each APD is represented by one pixel. The absolute distance measuring unit 206 provides distance data and/or the distance map image to the system controlling unit 200.

The LIDAR system as described above is operated as follows.

When the source light is generated and emitted from the light source 100 under a control of the system controlling unit 200, the source light is reflected by the light source mirror 120 and is incident to the micro mirror 140.

The mirror driving unit 204 is driven, such that the micro mirror 140 periodically rotates in the left and right directions and the upward and downward directions. Therefore, the reflected light incident to the micro mirror 140 is reflected in a direction continuously varied by the micro mirror 140, and the reflected scan light is refracted by the wide angle lens 150 and is then emitted in the forward direction of the apparatus.

The emitted scan light is reflected or scattered by the external reflector and is then returned. The returned received light is refracted by the wide angle lens 150 and is then incident to the reception mirror 130. The received light reflected by the reception mirror 130 is condensed by the condensing lens 170 and is imaged in the APDs of the light detecting unit 180. In addition, each APD of the light detecting unit 180 converts the imaged received light into an electrical signal.

The absolute distance measuring unit 206 calculates the distance up to the reflector in each APD unit, and configures the distance map image. Here, the distance map image indicates an image in which luminance and/or colors of pixels corresponding to reflector reflection points are configured to be changed depending on distances up to the respective reflector reflection points.

According to the optical system illustrated in FIG. 1, since the received light may not be reflected in a portion of the reception mirror 130 in which the through-hole 132 is formed, information on a portion corresponding to this portion may not be present in the distance map image. However, the through-hole 132 is formed at a size as small as possible in a range in which a light path is not blocked, thereby making it possible to sufficiently reduce the non-detected region as described above. In an exemplary embodiment, a diameter of a mirror surface of the micro mirror 140 may be approximately 1 millimeter (mm), and a diameter of the through-hole 132 may be several millimeters.

Figure 5:
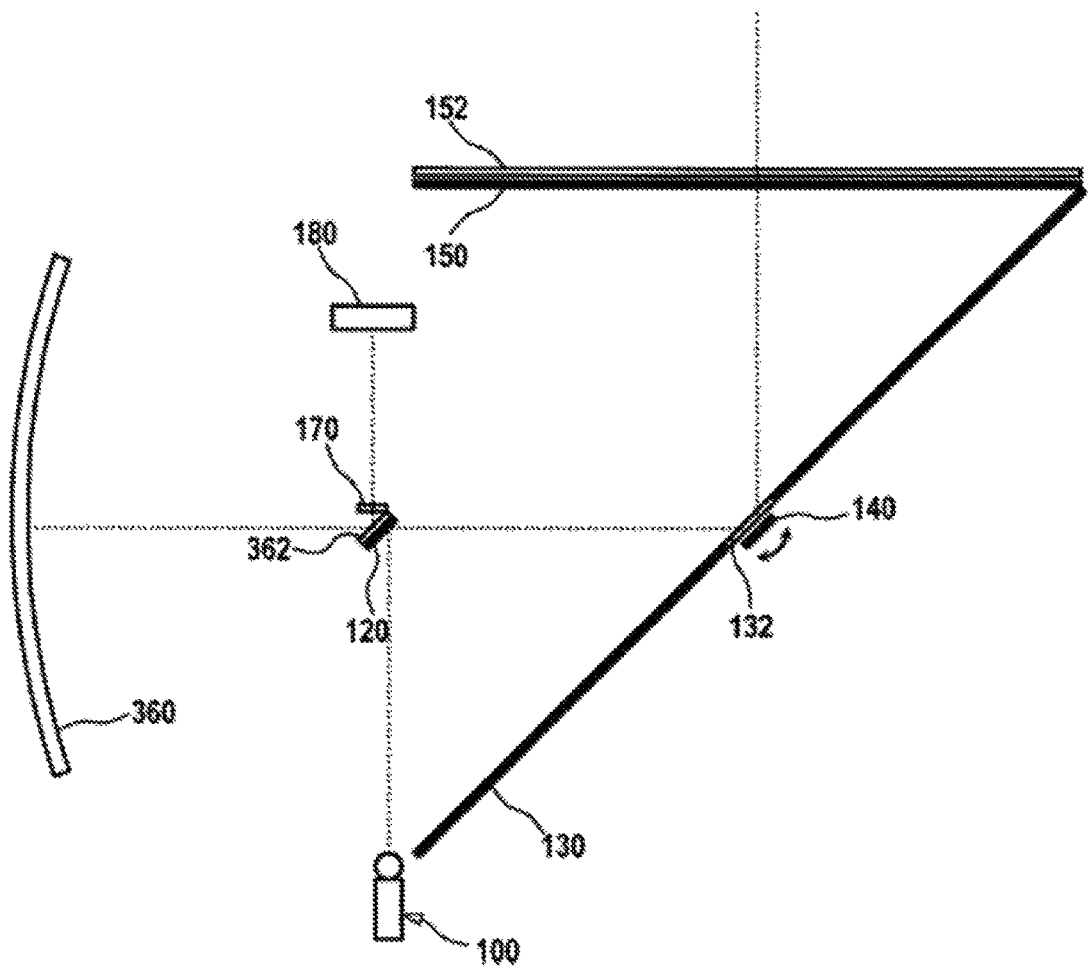
FIG. 5 is a view illustrating a configuration of a transmitting and receiving optical system of a LIDAR apparatus according to a second exemplary embodiment of the present invention.

FIG. 5 illustrates a LIDAR apparatus according to a second exemplary embodiment of the present invention.

The LIDAR apparatus according to the present exemplary embodiment includes a light source 100, a light source mirror 120 disposed above the light source 100 in FIG. 5, a reception mirror 130 and a micro mirror 140 disposed in a lateral direction of the light source mirror 120, a concave reflection mirror 360 positioned at an opposite side to the reception mirror 130 in relation to the light source mirror 120, a detector mirror 362 disposed in front of the concave reflection mirror 360, and a light detecting unit 180 provided above the detector mirror 362. A separate condensing lens 170 may be additionally provided on a front surface of the light detecting unit 180. In addition, also in the present exemplary embodiment, a wide angle lens 150 and a filter 152 may be additionally provided in front of an assembly of the reception mirror 130 and the micro mirror 140, that is, on a movement path of the scan light, similar to the first exemplary embodiment.

Since configurations and functions of the light source 100, the light source mirror 120, the reception mirror 130, the micro mirror 140, the wide angle lens 150, the filter 152, the condensing lens 170, and the light detecting unit 180 are the same as those of the first exemplary embodiment illustrated in FIG. 1, a detailed description therefor will be omitted. In addition, the electrical components illustrated in FIG. 4 may be similarly applied in the present exemplary embodiment.

Referring to FIG. 5, the concave reflection mirror 360 condenses received light refracted by the wide angle lens 150 and reflected by the reception mirror 130. The reflector mirror 362 reflects the received light condensed by the concave reflection mirror 360 toward the light detecting unit 180. In a preferable exemplary embodiment, the detector mirror 362 is integrated with the light source mirror 120, and is manufactured separately from the light source mirror 120 and rear surfaces of the detector mirror 362 and the light source mirror 120 are attached to each other so that the detector mirror 362 and the light source mirror 120 are directed toward different directions, or is manufactured by mirror-coating both surfaces of one member. The condensing lens 170 condenses the received light re-reflected by the detector mirror 362 to allow the received light to be incident to an inner portion of a narrow sensor surface of the light detecting unit 180.

In the LIDAR apparatus according to the present exemplary embodiment, transmitted light and received light move as follows.

Figure 6:
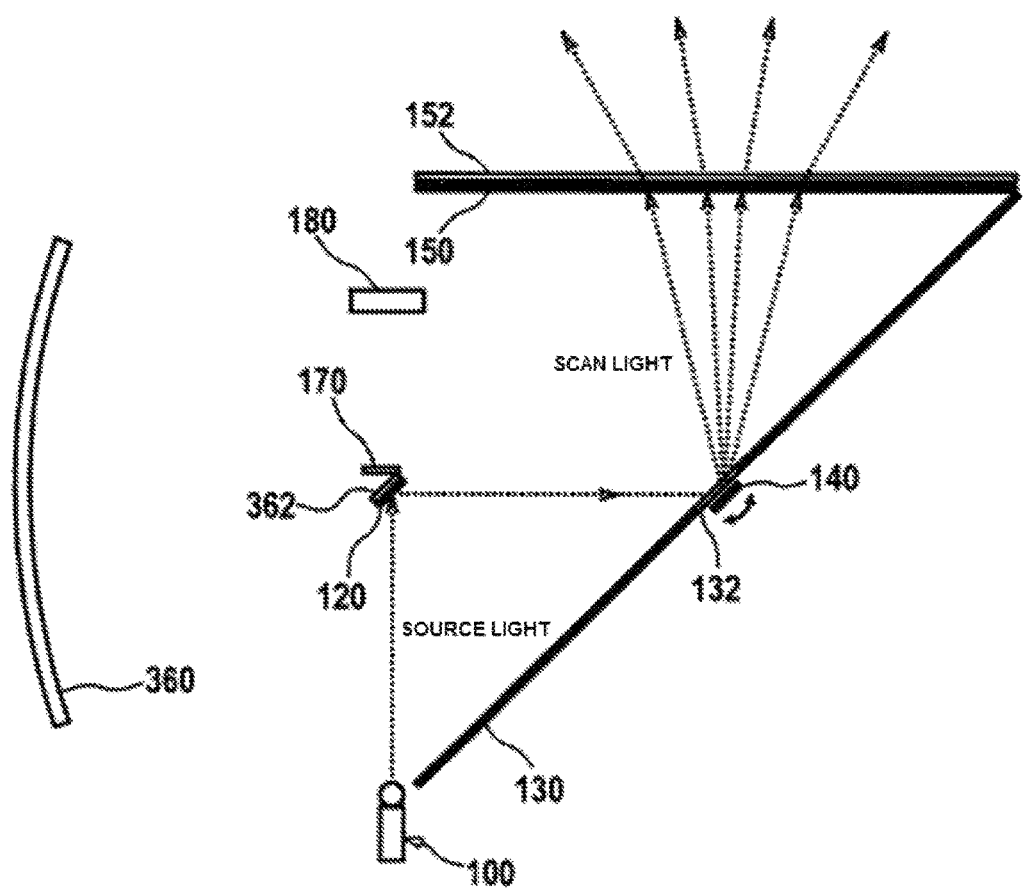
FIG. 6 is a view illustrating a light path of transmitted light in the LIDAR apparatus of FIG. 5.

As illustrated in FIG. 6, the source light emitted from the light source 100 is reflected by the light source mirror 120 and is incident to the micro mirror 140. The source light is re-reflected by the micro mirror 140 that rotates, and is then refracted by the wide angle lens 150. The scan light refracted by the wide angle lens 150 moves in the forward direction of the apparatus in which an external reflector, that is, a detection target may be present.

Figure 7:
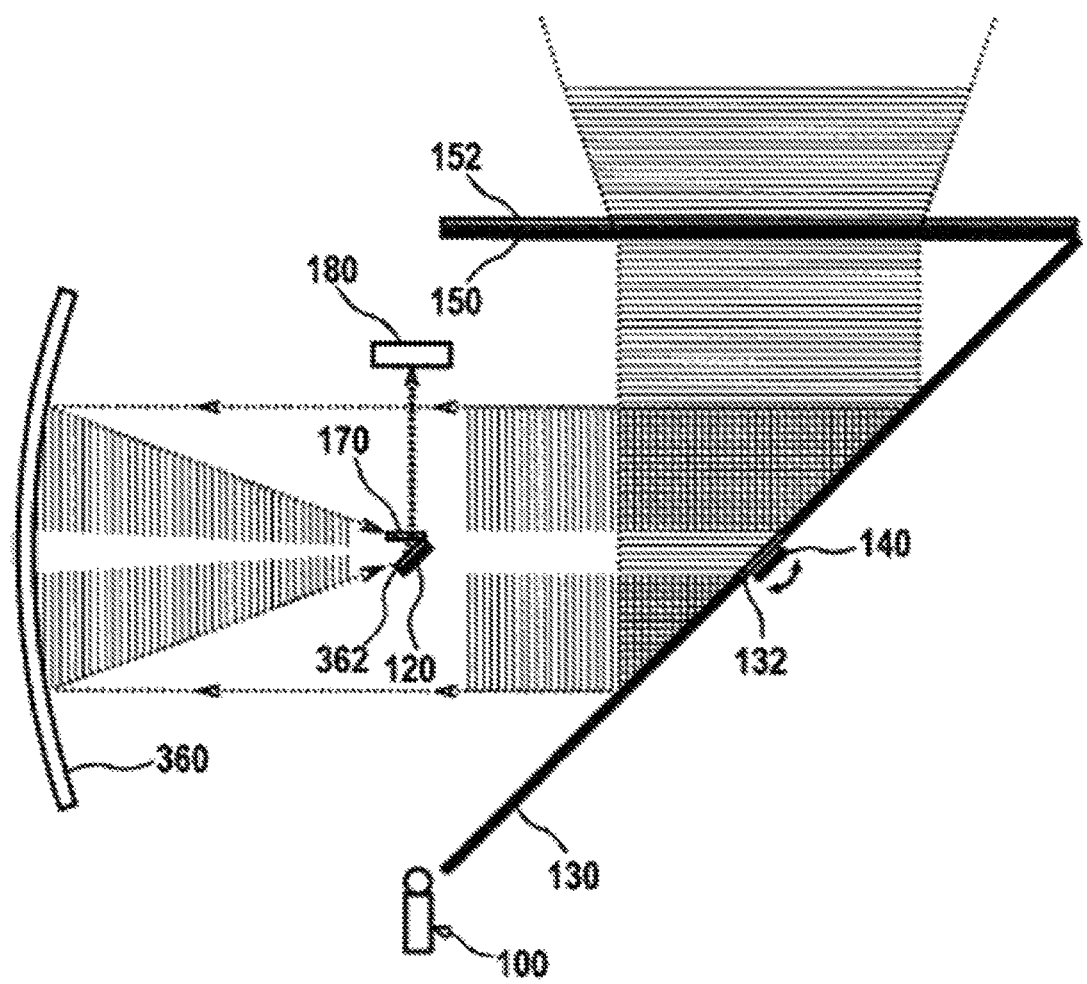
FIG. 7 is a view illustrating a light path of received light in the LIDAR apparatus of FIG. 5.

Meanwhile, as illustrated in FIG. 7, the received light reflected by the external reflector and then returned is refracted by the wide angle lens 150 and is then incident to the reception mirror 130. The received light reflected by the reception mirror 130 is condensed by the concave reflection mirror 360. The received light condensed by the concave reflection mirror 360 is re-reflected by the detector mirror 362 to thereby be directed toward the light detecting unit 180, and is refracted and condensed by the condensing lens 170 and is then imaged in the light detecting unit 180.

Since an operation and other features of the LIDAR apparatus illustrated in FIG. 5 are the same as those of the LIDAR apparatus illustrated in FIG. 1, a detailed description therefor will be omitted.

Figure 8:
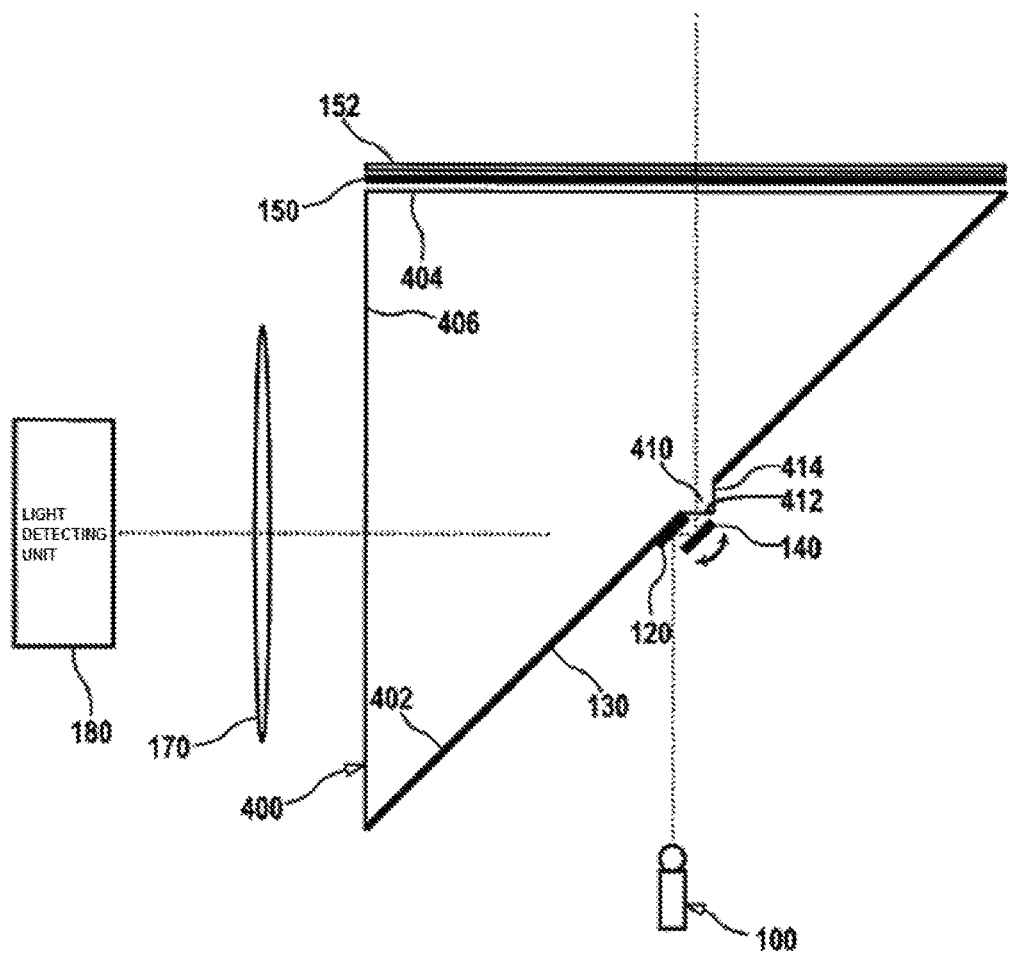
FIG. 8 is a view illustrating a configuration of a transmitting and receiving optical system of a LIDAR apparatus according to a third exemplary embodiment of the present invention.

FIG. 8 illustrates a LIDAR apparatus according to a third exemplary embodiment of the present invention.

The LIDAR apparatus according to the present exemplary embodiment includes a light source 100 and a triangular prism 400 disposed above the light source 100 in FIG. 8. In an exemplary embodiment, the triangular prism 400 is a triangular prism having an inclined surface 402, a first side surface 404, and a second side surface 406 and having a triangular cross section. Particularly, it is preferable that the prism 400 is a right-angle prism in which the first side surface 404 and the second side surface 406 are orthogonal to each other in order to facilitate processing and assembling of each optical component.

In addition, the LIDAR apparatus of FIG. 8 includes a light source mirror 120 and a micro mirror 140 disposed outside the inclined surface 402 of the triangular prism 400, and a condensing lens 170 and a light detecting unit 180 disposed outside the second side surface 406 of the triangular prism 400. In addition, also in the present exemplary embodiment, a wide angle lens 150 and a filter 152 may be additionally provided outside the first side surface 404 of the triangular prism 400.

Since configurations and functions of the light source 100, the light source mirror 120, the micro mirror 140, the wide angle lens 150, the filter 152, the condensing lens 170, and the light detecting unit 180 are the same as or similar to those of the first exemplary embodiment illustrated in FIG. 1, a detailed description therefor will be omitted. In addition, the electrical components illustrated in FIG. 4 may be similarly applied in the present exemplary embodiment.

The inclined surface 402 of the prism 400 serves as the reception mirror 130 reflecting the received light emitted from the LIDAR apparatus, reflected by the external reflector, and then returned toward the light detecting unit 180. Although the inclined surface 402 of the prism 400 generally has sufficient reflection characteristics in itself, it is preferable that reflection coating is performed on the inclined surface 402 so that a reflection surface is directed toward an inner side of the prism 400 in order to minimize loss of light.

A protrusion part 410 protruding outward is formed on the inclined surface 402 of the prism 400. The protrusion part 410 has a source incident surface 412 that is in parallel with the first side surface 404 and a vertical surface 414 that is in parallel with the second side surface 406 and connecting an end portion of the source incident surface 412 and the inclined surface 402 to each other.

The light source mirror 120 is attached to the vicinity of an inner corner of the protrusion part 410 on the inclined surface 402 of the prism 400. The light source mirror 120 may be implemented by performing reflection coating for implementing the reception mirror 130 on the inclined surface 402 of the prism 400 and then performing reflection coating on a rear surface of the reflection coating so that a reflection surface is directed toward the outside or attaching a mirror to the rear surface of the reflection coating. The light source mirror 120 serves to reflect the source light emitted from the light source 100 toward the micro mirror 140. In the present exemplary embodiment, the light source 100 is disposed below the light source mirror 120 so that the source light is directed toward the center of the light source mirror 120.

The micro mirror 140 is installed below the source incident surface 412 of the protrusion part 410. Particularly, the micro mirror 140 is disposed to be directed between the source incident surface 412 of the inclined surface 402 of the prism 400 and the light source mirror 120 in a normal state. The micro mirror 140 re-reflects the source light reflected by the light source mirror 120 and then incident thereto to allow the re-reflected scan light to move in a forward direction (an upward direction in FIG. 8) of the apparatus through the source incident surface 412 and the first side surface 404 of the prism 400.

In the LIDAR apparatus according to the present exemplary embodiment, transmitted light and received light move as follows.

Figure 9:
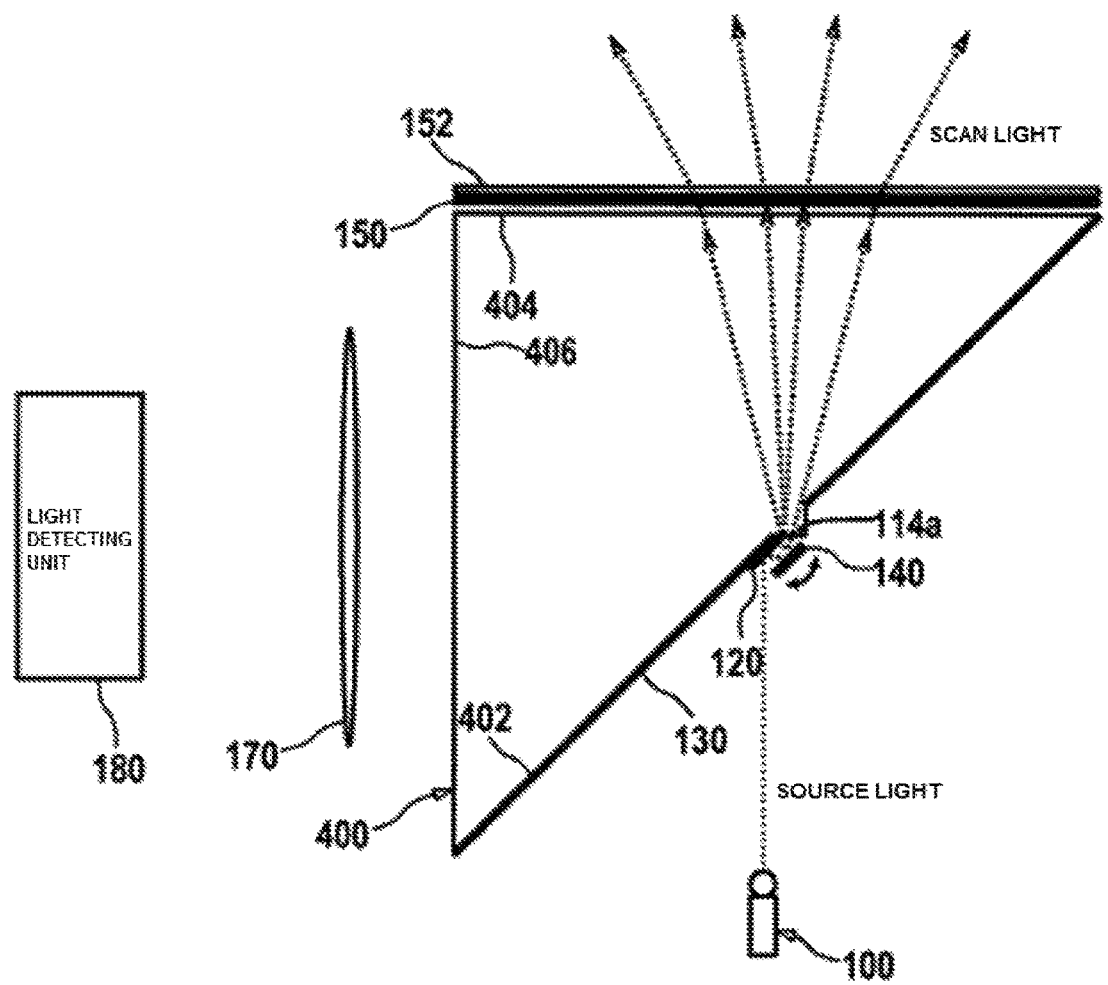
FIG. 9 is a view illustrating a light path of transmitted light in the LIDAR apparatus of FIG. 8.

As illustrated in FIG. 9, the source light emitted from the light source 100 is reflected by the light source mirror 120 and is incident to the micro mirror 140. The source light is re-reflected by the micro mirror 140 that rotates, is incident to an inner portion of the prism 400 through the source incident surface 412 of the protrusion part 410 of the prism 400, and is emitted through the first side surface 404. The scan light emitted from the prism 400 is refracted by the wide angle lens 150. The scan light refracted by the wide angle lens 150 moves in the forward direction of the apparatus in which an external reflector, that is, a detection target may be present.

Figure 10:
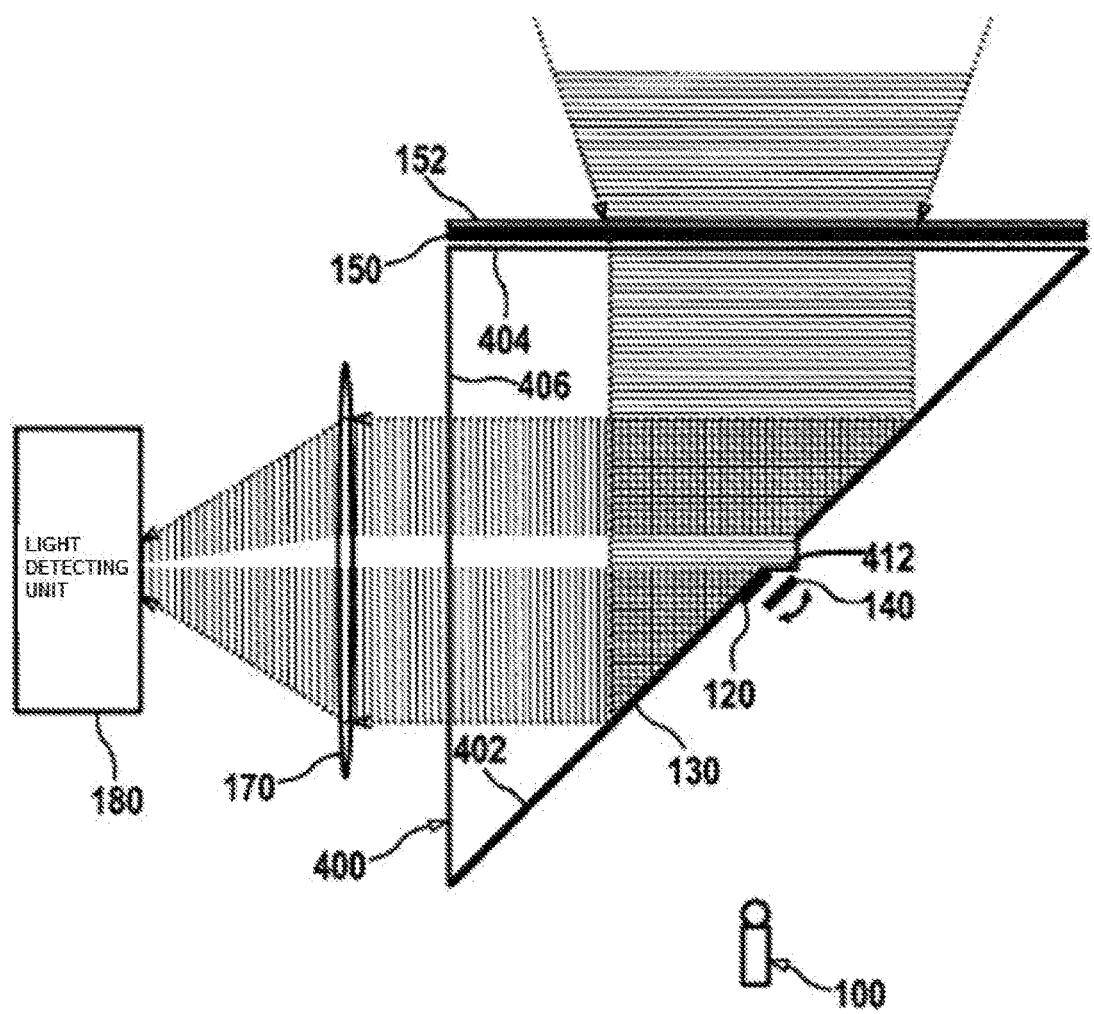
FIG. 10 is a view illustrating a light path of received light in the LIDAR apparatus of FIG. 8.

Meanwhile, as illustrated in FIG. 10, the received light reflected by the external reflector and then returned is refracted by the wide angle lens 150 and is then incident to the inner portion of the prism 400 through the first side surface 404 of the prism 400. In the inner portion of the prism 400, the received light is reflected by the inclined surface 402, is emitted through the second side surface 406, is condensed by the condensing lens 170, and is then converted into an electrical signal by the light detecting unit 180.

Since an operation and other features of the LIDAR apparatus illustrated in FIG. 8 are the same as those of the LIDAR apparatus illustrated in FIG. 1, a detailed description therefor will be omitted.

According to the optical system illustrated in FIG. 8, since the received light may not be reflected in a portion in which the protrusion part 410 of the prism 400 is formed, information on a portion corresponding to this portion may not be present in the distance map image. However, the protrusion part 410 of the prism 400 is formed at a size as small as possible in a range in which a light path is not blocked, thereby making it possible to sufficiently reduce the non-detected region as described above.

Figure 11:
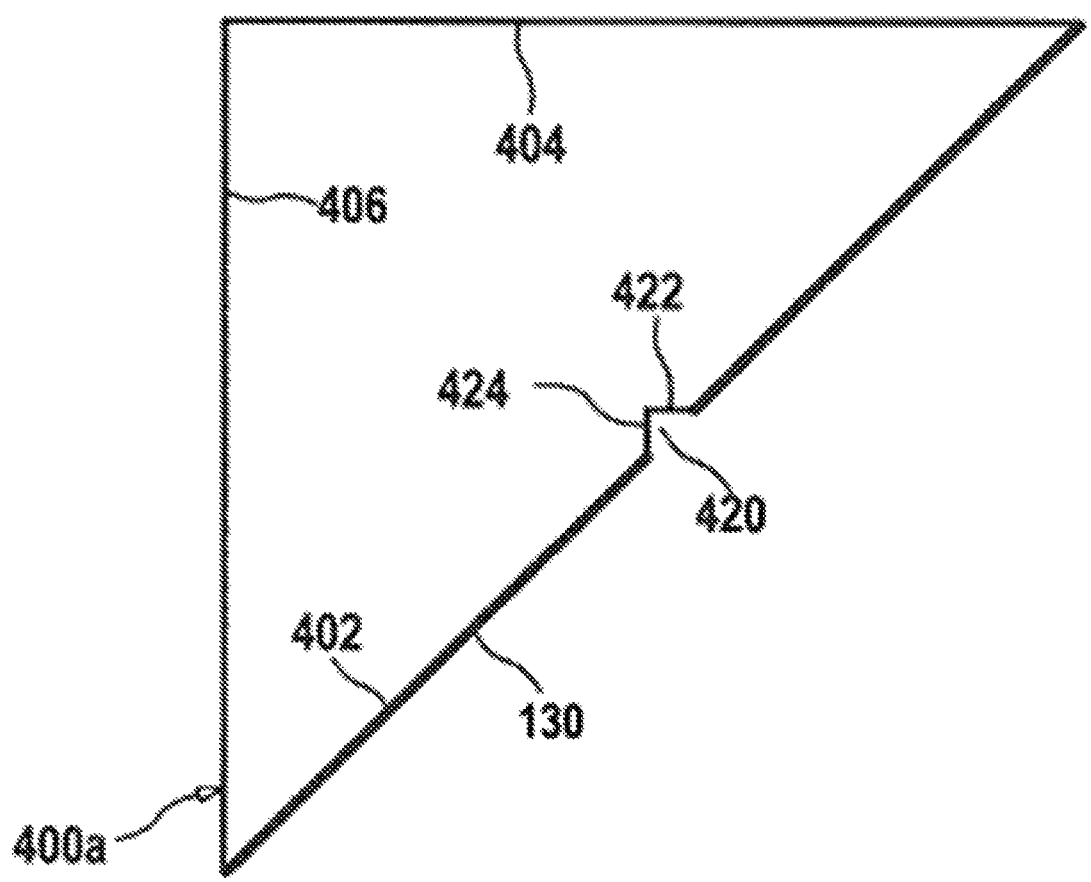
FIG. 11 is a view illustrating a modified exemplary embodiment of a triangular prism illustrated in FIG. 8.

In another exemplary embodiment modified from the exemplary embodiment of FIG. 8, a groove depressed from the inclined surface 402 into the prism may also be formed instead of the protrusion part 410. FIG. 11 illustrates a prism 400a according to the exemplary embodiment as described above. In the exemplary embodiment illustrated in FIG. 11, an inclined surface of 402 of the prism 400a is provided with a groove 420 depressed inward. The groove 420 has a source incident surface 422 that is in parallel with the first side surface 404 and a vertical surface 424 that is in parallel with the second side surface 406 and connecting an inner end portion of the source incident surface 422 and the inclined surface 402 to each other. Since an operation of the LIDAR apparatus adopting the prism as described above is the same as that of the LIDAR apparatus described above, a description therefor will be omitted.

Figure 12:
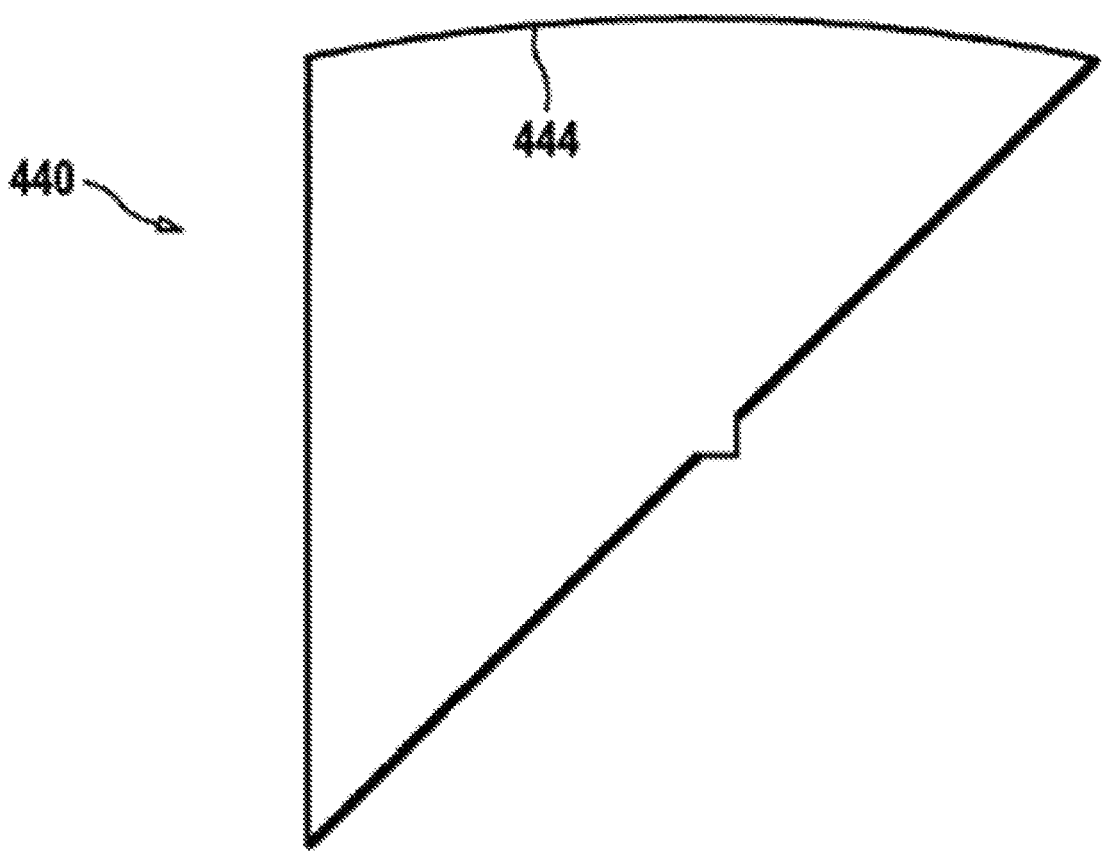
FIG. 12 is a view illustrating a form of a prism according to another exemplary embodiment of the present invention.

Meanwhile, in still another exemplary embodiment, the prism 400 and the wide angle lens 150 illustrated in FIG. 8 may be integrated with each other. FIG. 12 illustrates an example of a prism 440 according to the exemplary embodiment as described above. In the exemplary embodiment illustrated in FIG. 12, a first side surface 444 of the prism 440 is formed as a curved surface convex outward rather than a plane surface. Therefore, the first side surface 444 serves as a convex lens. In the case of adopting the prism 440 as described above, the wide angle lens 150 does not need to be separately prepared, such that a cost required for processing the wide angle lens 150 and a man-hour for assembling and alignment of the wide angle lens 150 may be significantly decreased. Since an operation of the LIDAR apparatus adopting the prism as described above is the same as that of the LIDAR apparatus described above, a description therefor will be omitted.

Figure 13:
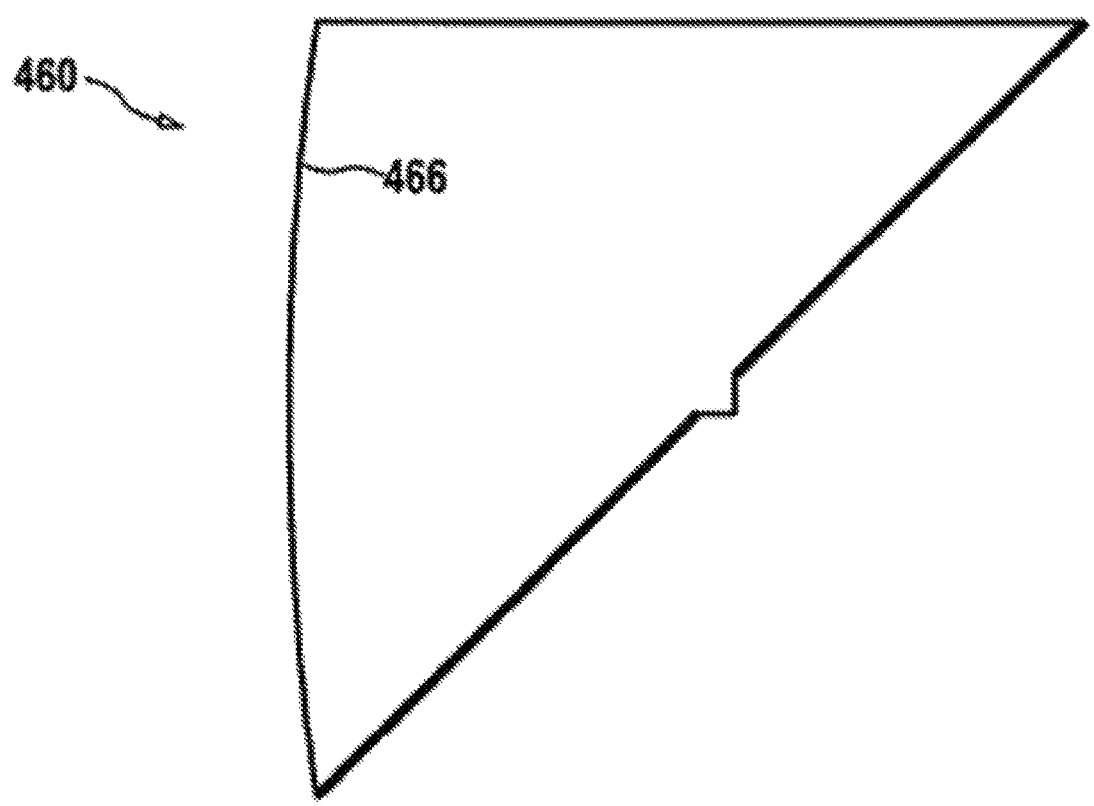
FIG. 13 is a view illustrating a form of a prism according to still another exemplary embodiment of the present invention.

In still another exemplary embodiment, the prism 400 and the condensing lens 170 illustrated in FIG. 8 may be integrated with each other. FIG. 13 illustrates an example of a prism 460 according to the exemplary embodiment as described above. In the exemplary embodiment illustrated in FIG. 13, a second side surface 466 of the prism 460 is formed as a curved surface convex outward rather than a plane surface. Therefore, the second side surface 466 serves as a convex lens. In the case of adopting the prism 466 as described above, the condensing lens 170 does not need to be separately prepared, such that a cost required for processing the condensing lens 170 and a man-hour for assembling and alignment of the condensing lens 170 may be significantly decreased. Since an operation of the LIDAR apparatus adopting the prism as described above is the same as that of the LIDAR apparatus described above, a description therefor will be omitted.

Figure 14:
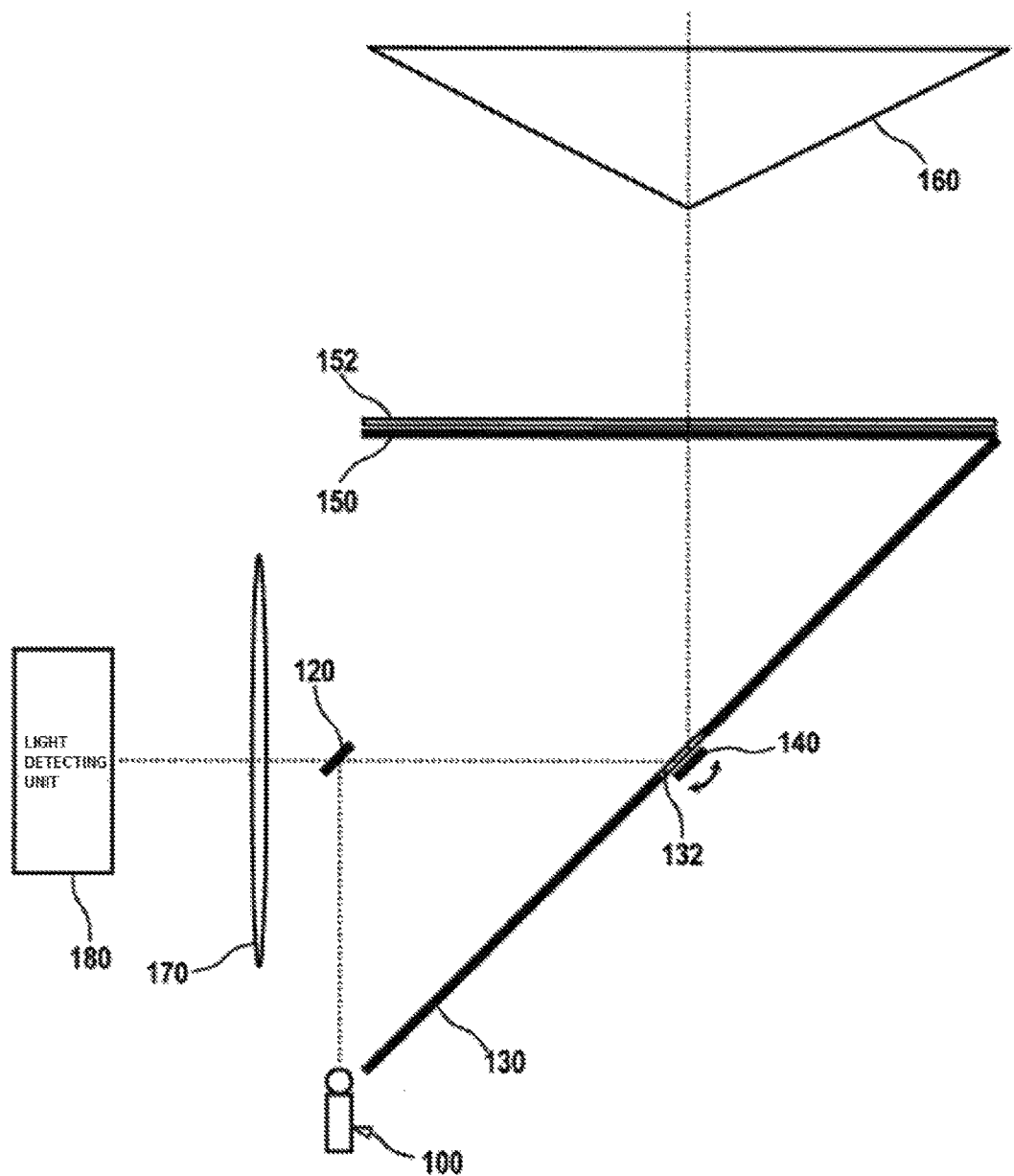
FIG. 14 is a view illustrating a configuration of a transmitting and receiving optical system of a LIDAR apparatus according to a fourth exemplary embodiment of the present invention.

Meanwhile, FIG. 14 illustrates a LIDAR apparatus according to a fourth exemplary embodiment of the present invention.

Referring to FIG. 14, a light detection and ranging (LIDAR) apparatus according to the present exemplary embodiment includes a light source 100, a light source mirror 120 disposed above the light source 100, a reception mirror 130 and a micro mirror 140 disposed in a lateral direction of the light source mirror 120, an upper mirror 160 positioned above the reception mirror 130, and a condensing lens 170 and a light detecting unit 180 positioned at an opposite side to the reception mirror 130 in relation to the light source mirror 120.

The light source 100 generates and emits source light for scanning a distance measurement target, and it is preferable that the source light is pulse laser. The light source mirror 120 has a quadrangular shape or a circular shape, and reflects the source light emitted from the light source 100 toward the micro mirror 140.

The micro mirror 140 re-reflects the source light reflected by the light source mirror 120 to allow the re-reflected laser light (that is, 'scan light') to move toward the upward mirror 160. The micro mirror 140 may be configured to rotate in left and right directions and upward and downward directions in relation to a front surface thereof, repeat an operation in which it periodically moves in the upward and downward directions and then returns to the upward direction, and rotate multiple times in the left and right directions in a period in which a direction of the micro mirror 140 is changed once from the upward direction to the downward direction. Therefore, the light reflected by the micro mirror 140 is scanned in each direction within a field of view in a predetermined pattern, and the scan light emitted from the LIDAR apparatus may be periodically scanned in the forward direction in a range of the field of view.

As described above, the micro mirror 140 is, preferably, the MEMS mirror in which the mirror is installed on the MEMS semiconductor, but is not necessarily limited thereto.

The upper mirror 160 reflects the scan light incident from the micro mirror 140 in a lateral direction or a lateral downward direction of the LIDAR apparatus. In addition, the upper mirror 160 reflects light introduced in the lateral direction or the lateral downward direction in a downward direction. Therefore, the upper mirror 160 reflects the received light emitted from the LIDAR apparatus, reflected or scattered (hereinafter, simply referred to as 'reflected') by the external reflector, and then returned, toward the light detecting unit 180.

In the present exemplary embodiment, the upper mirror 160 has a cone shape of which a vertex is positioned at a lower portion. However, in a modified exemplary embodiment, the upper mirror 160 may also be implemented by a convex mirror of which a reflection surface is convex downward. Meanwhile, in the exemplary embodiment illustrated, the upper mirror 160 is symmetrically processed so as to have the same reflection angle characteristics in all horizontal directions. However, in another exemplary embodiment, the upper mirror 160 may also be asymmetrically processed to allow scanning to be performed on the basis of a specific direction.

The reception mirror 130 reflects the received light incident from the upper mirror 160 toward the light detecting unit 180. The reception mirror 130 has a quadrangular shape or a circular shape, and includes a through-hole 132 formed at approximately the center thereof. The micro mirror 140 may be installed behind the through-hole 132 of the reception mirror 130 to allow the source light incident to the micro mirror 140 and the scan light emitted from the micro mirror 140 to move while penetrating through the through-hole 132. That is, the reception mirror 130 allows light paths of the source light and the scan light not to be blocked while reflecting the received light toward the light detecting unit 180.

In a preferable exemplary embodiment, a wide angle lens 150 and a filter 152 may be additionally provided between an assembly of the reception mirror 130 and the micro mirror 140 and the upper mirror 160. The wide angle lens 150 extends an angle at which the scan light emits, thereby widening a field of view. The filter 152 passes only light in a wavelength band generated by the light source 100 therethrough to prevent light in another band from being mixed with the light in the wavelength band generated by the light source 100 as noise, blocks foreign materials such as water, dust, or the like, from being introduced to protect an inner portion of the LIDAR apparatus, and prevents the scan light and the received light from being reflected by the wide angle lens 150. The filter 152 may be implemented as a coating for the wide angle lens 150.

The condensing lens 170 condenses the received light reflected by the upper mirror 160, refracted by the wide angle lens 150, and then re-reflected by the reception mirror 130. The light detecting unit 180 detects the condensed received light. As the light detecting unit 180, for example, one or more avalanche photodiode (APD) arrays may be used.

In the LIDAR apparatus according to the present exemplary embodiment, transmitted light and received light move as follows.

Figure 15:
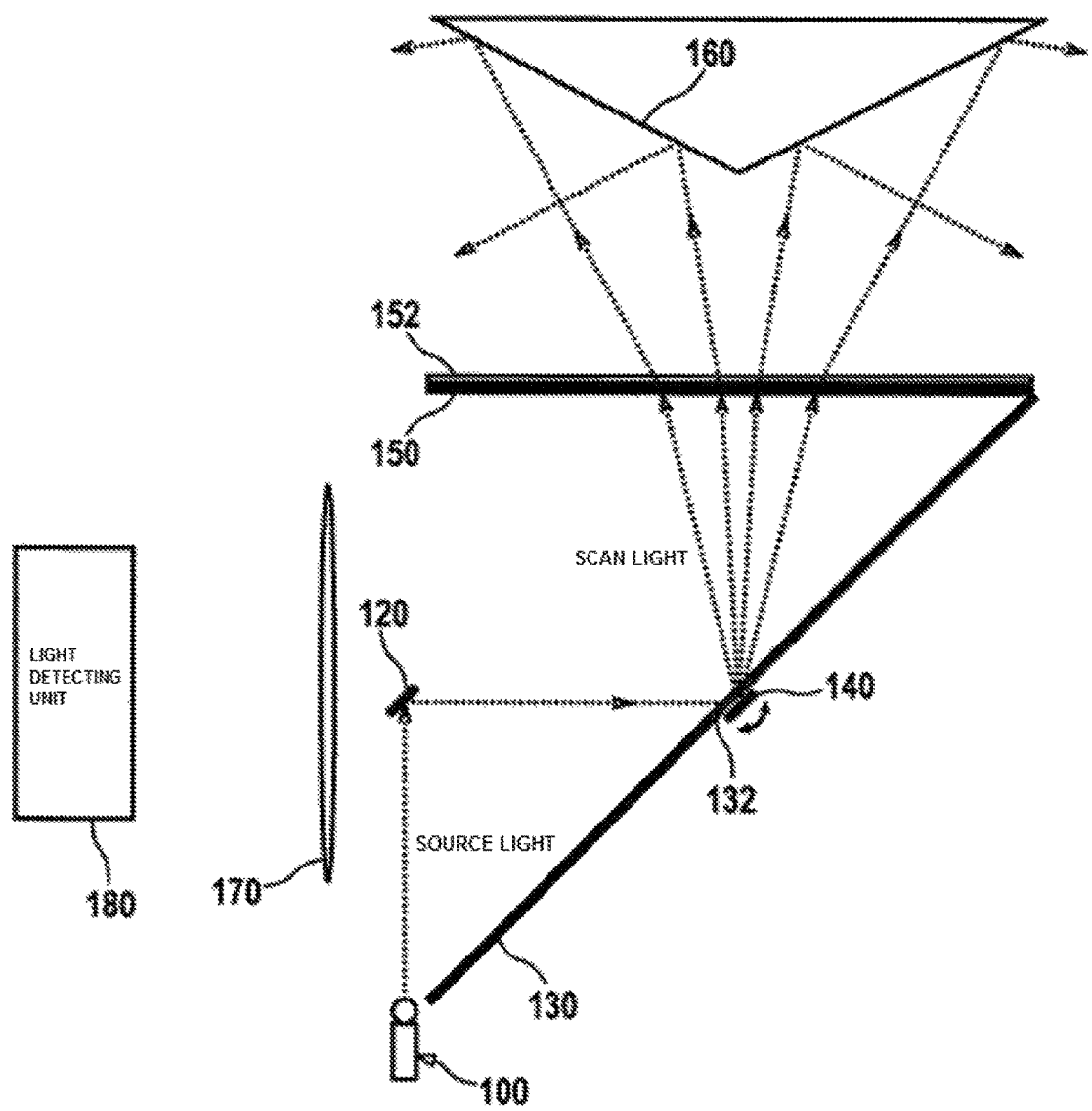
FIG. 15 is a view illustrating a light path of transmitted light in the LIDAR apparatus of FIG. 14.

As illustrated in FIG. 15, the source light emitted from the light source 100 is reflected by the light source mirror 120 and is incident to the micro mirror 140. The source light is re-reflected by the micro mirror 140 that rotates, and is then refracted by the wide angle lens 150. The scan light refracted by the wide angle lens 150 is reflected by the upper mirror 160 to be propagated in the lateral direction or the lateral downward direction of the LIDAR apparatus.

Figure 16:
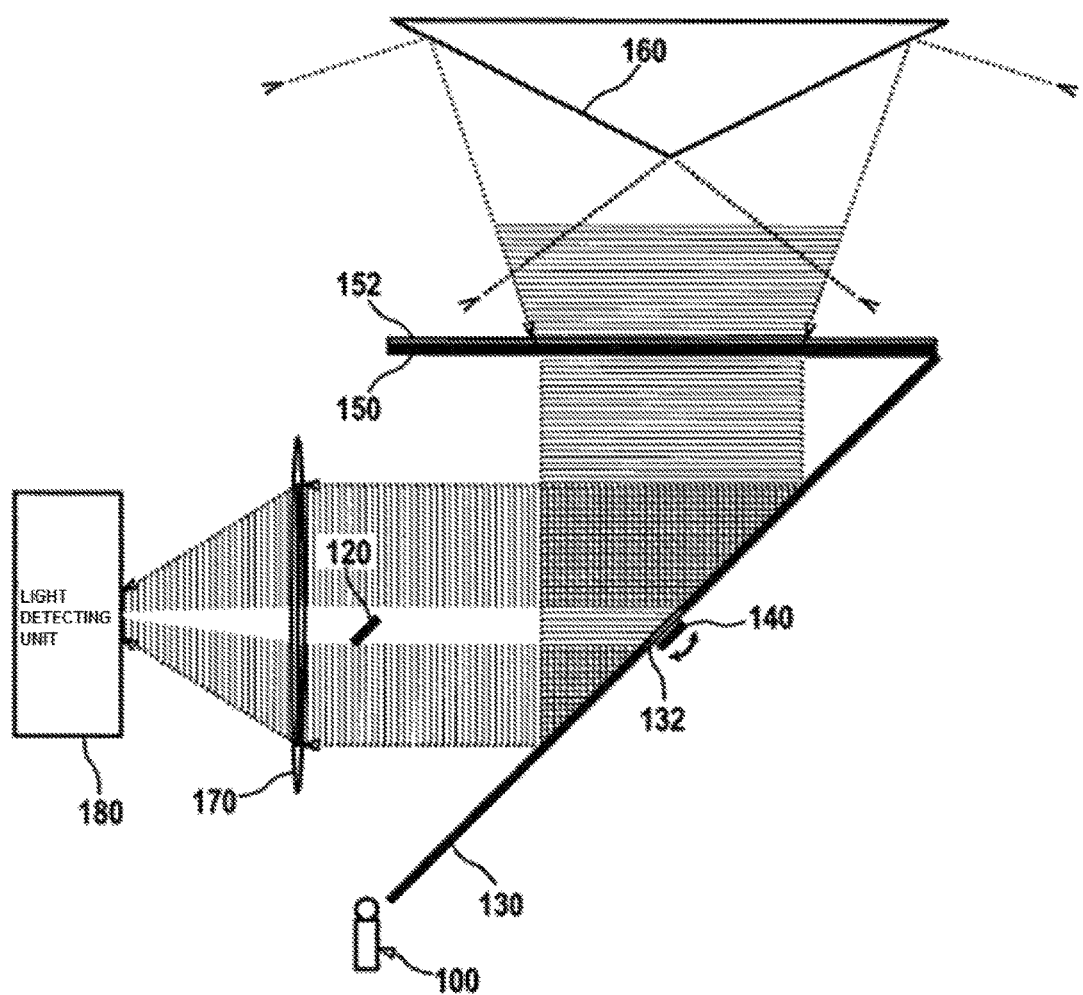
FIG. 16 is a view illustrating a light path of received light in the LIDAR apparatus of FIG. 14.

Meanwhile, as illustrated in FIG. 16, the received light reflected by the external reflector and then returned is reflected in the downward direction by the upper mirror 160, is refracted by the wide angle lens 150, and is then incident to the reception mirror 130. The received light re-reflected by the reception mirror 130 is condensed by the condensing lens 170 and is then converted into an electrical signal by the light detecting unit 180.

The electrical components illustrated in FIG. 4 may be applied in the present exemplary embodiment. That is, the LIDAR apparatus according to the present exemplary embodiment electrically includes a system controlling unit 200, a light transmitting unit 202, a mirror driving unit 204, the light detecting unit 180, and an absolute distance measuring unit 206.

The system controlling unit 200 controls a general operation of the LIDAR apparatus.

The light transmitting unit 202 includes the light source 100 illustrated in FIG. 14 to generate source laser light under a control of the system controlling unit 200, and outputs the generated source laser light through an optical system illustrated in FIG. 14.

The mirror driving unit 204 generates and outputs a mirror driving signal for driving horizontal rotation and vertical rotation of the micro mirror 140 under a control of the system controlling unit 200. In a preferable exemplary example, information on a horizontal rotation amount and a vertical rotation amount of the micro mirror 140 depending on the mirror driving signal is stored in a lookup table (not illustrated), and the mirror driving unit 204 generates the mirror driving signal on the basis of the information stored in the lookup table with reference to scan region range information pre-set in the system controlling unit 200 depending on an application field. The scan region range information may also be changed depending on setting of a user.

The light detecting unit 180 detects the received light condensed by the condensing lens 170, as described above. The absolute distance measuring unit 206 calculates a distance up to the reflector on the basis of a time of flight of an optical signal, that is, a time from a point in time in which the source light is generated by the light transmitting unit 202 to a point in time in which the received light is detected by the light detecting unit 180. As described above, in a preferable exemplary embodiment, the light detecting unit 180 is implemented using the APD array including a plurality of APDs. In this exemplary embodiment, the absolute distance measuring unit 206 calculates the distance up to the reflector in each APD unit. Particularly, in a preferable exemplary embodiment, the absolute distance measuring unit 206 configures a distance map image in which the distance calculated for each APD is represented by one pixel. The absolute distance measuring unit 206 provides distance data and/or the distance map image to the system controlling unit 200.

The LIDAR system as described above is operated as follows.

When the source light is generated and emitted from the light source 100 under a control of the system controlling unit 200, the source light is reflected by the light source mirror 120 and is incident to the micro mirror 140.

The mirror driving unit 204 is driven, such that the micro mirror 140 periodically rotates in the left and right directions and the upward and downward directions. Therefore, the reflected light incident to the micro mirror 140 is reflected in a direction continuously varied by the micro mirror 140, and the reflected scan light is refracted by the wide angle lens 150 and is then reflected by the upper mirror 160 to thereby be emitted in the lateral direction or the lateral downward direction of the LIDAR apparatus.

The emitted scan light is reflected or scattered by the external reflector and is then returned. The returned received light is reflected in the downward direction by the upper mirror 160, is refracted by the wide angle lens 150, and is then incident to the reception mirror 130. The received light reflected by the reception mirror 130 is condensed by the condensing lens 170 and is imaged in the APDs of the light detecting unit 180. In addition, each APD of the light detecting unit 180 converts the imaged received light into an electrical signal.

The absolute distance measuring unit 206 calculates the distance up to the reflector in each APD unit, and configures the distance map image. Here, the distance map image indicates an image in which luminance and/or colors of pixels corresponding to reflector reflection points are configured to be changed depending on distances up to the respective reflector reflection points.

According to the optical system illustrated in FIG. 14, since the received light may not be reflected in a portion of the reception mirror 130 in which the through-hole 132 is formed, information on a portion corresponding to this portion may not be present in the distance map image. However, the through-hole 132 is formed at a size as small as possible in a range in which a light path is not blocked, thereby making it possible to sufficiently reduce the non-detected region as described above. In an exemplary embodiment, a diameter of a mirror surface of the micro mirror 140 may be approximately 1 millimeter (mm), and a diameter of the through-hole 132 may be several millimeters.

Figure 17:
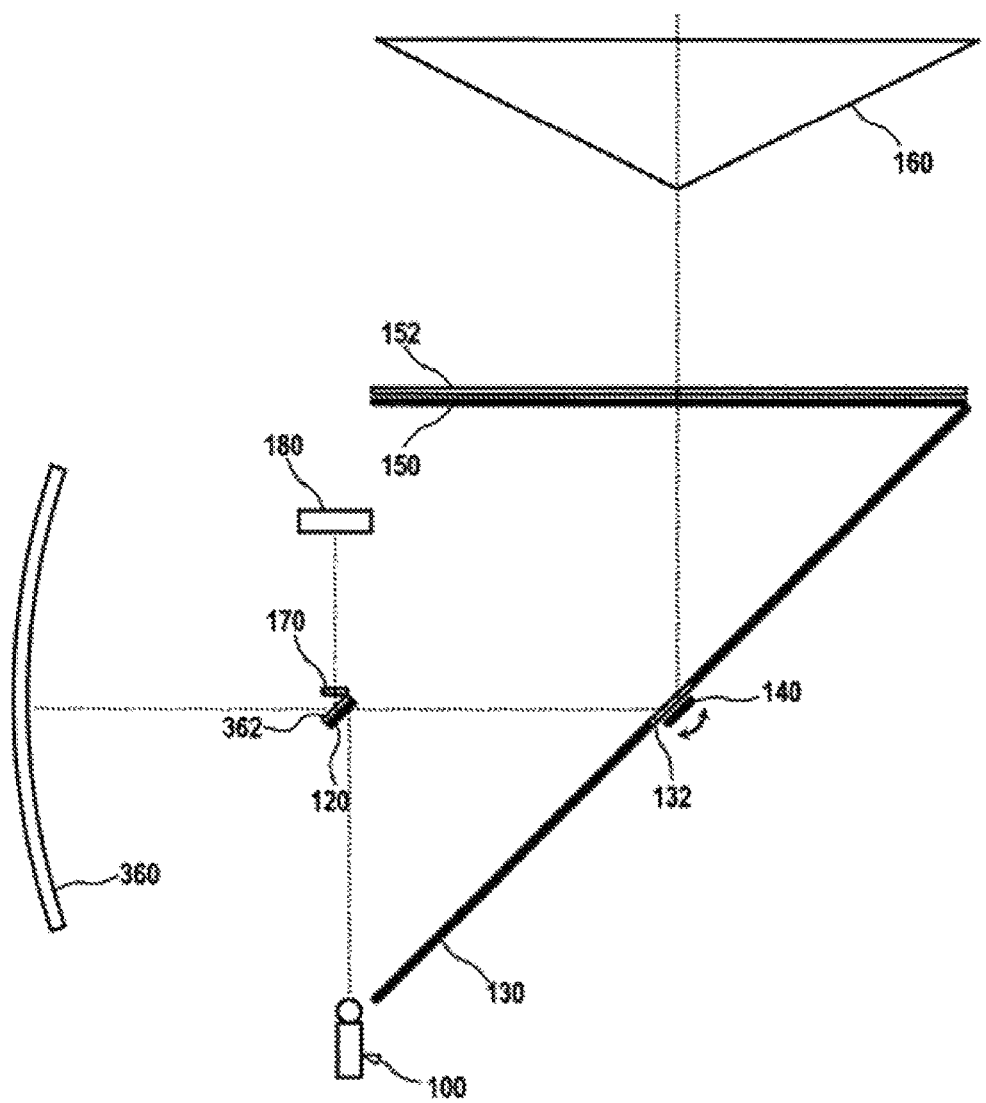
FIG. 17 is a view illustrating a configuration of a transmitting and receiving optical system of a LIDAR apparatus according to a fifth exemplary embodiment of the present invention.

FIG. 17 illustrates a LIDAR apparatus according to a fifth exemplary embodiment of the present invention.

The LIDAR apparatus according to the present exemplary embodiment includes a light source 100, a light source mirror 120 disposed above the light source 100, a reception mirror 130 and a micro mirror 140 disposed in a lateral direction of the light source mirror 120, an upper mirror 160 positioned above the reception mirror 130, a concave reflection mirror 360 positioned at an opposite side to the reception mirror 130 in relation to the light source mirror 120, a detector mirror 362 disposed in front of the concave reflection mirror 360, and a light detecting unit 180 provided above the detector mirror 362. A separate condensing lens 170 may be additionally provided on a front surface of the light detecting unit 180. In addition, also in the present exemplary embodiment, a wide angle lens 150 and a filter 152 may be additionally provided between the assembly of the reception mirror 130 and the micro mirror 140 and the upper mirror 160, similar to the fourth exemplary embodiment.

Since configurations and functions of the light source 100, the light source mirror 120, the reception mirror 130, the micro mirror 140, the wide angle lens 150, the filter 152, the condensing lens 170, and the light detecting unit 180 are the same as those of the fourth exemplary embodiment illustrated in FIG. 14, a detailed description therefor will be omitted. In addition, the electrical components illustrated in FIG. 4 may be similarly applied in the present exemplary embodiment.

Referring to FIG. 17, the concave reflection mirror 360 condenses the received light reflected by the upper mirror 160, refracted by the wide angle lens 150, and then re-reflected by the reception mirror 130. The reflector mirror 362 reflects the received light condensed by the concave reflection mirror 360 toward the light detecting unit 180. In a preferable exemplary embodiment, the detector mirror 362 is integrated with the light source mirror 120, and is manufactured separately from the light source mirror 120 and rear surfaces of the detector mirror 362 and the light source mirror 120 are attached to each other so that the detector mirror 362 and the light source mirror 120 are directed toward different directions, or is manufactured by mirror-coating both surfaces of one member. The condensing lens 170 condenses the received light re-reflected by the detector mirror 362 to allow the received light to be incident to an inner portion of a narrow sensor surface of the light detecting unit 180.

In the LIDAR apparatus according to the present exemplary embodiment, transmitted light and received light move as follows.

Figure 18:
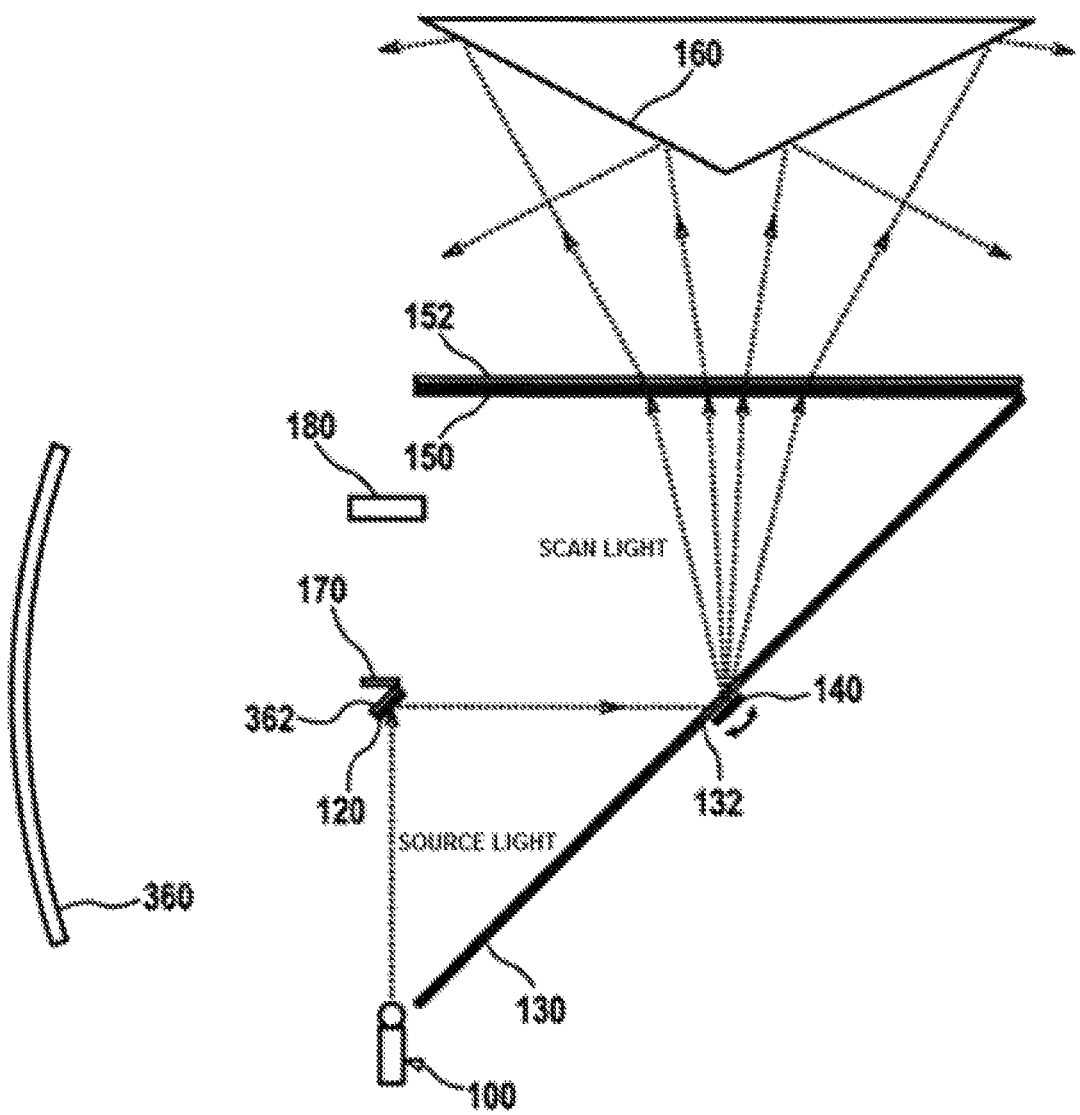
FIG. 18 is a view illustrating a light path of transmitted light in the LIDAR apparatus of FIG. 17.

As illustrated in FIG. 18, the source light emitted from the light source 100 is reflected by the light source mirror 120 and is incident to the micro mirror 140. The source light is re-reflected by the micro mirror 140 that rotates, and is then refracted by the wide angle lens 150. The scan light refracted by the wide angle lens 150 is reflected by the upper mirror 160 to be propagated in the lateral direction or the lateral downward direction of the LIDAR apparatus.

Figure 19:
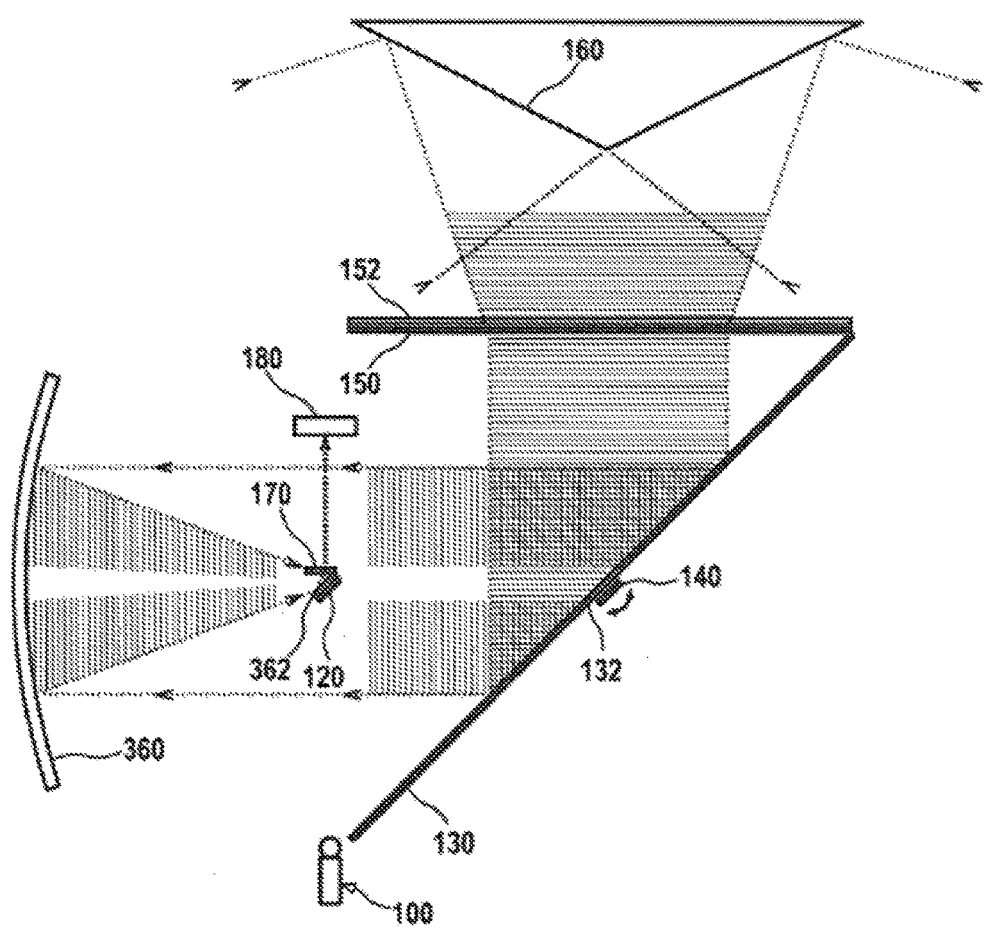
FIG. 19 is a view illustrating a light path of received light in the LIDAR apparatus of FIG. 17.

Meanwhile, as illustrated in FIG. 19, the received light reflected by the external reflector and then returned is reflected in the downward direction by the upper mirror 160, is refracted by the wide angle lens 150, and is then incident to the reception mirror 130. The received light re-reflected by the reception mirror 130 is condensed by the concave reflection mirror 360. The received light condensed by the concave reflection mirror 360 is re-reflected by the detector mirror 362 to thereby be directed toward the light detecting unit 180, and is refracted and condensed by the condensing lens 170 and is then imaged in the light detecting unit 180.

Since an operation and other features of the LIDAR apparatus illustrated in FIG. 17 are the same as those of the LIDAR apparatus illustrated in FIG. 14, a detailed description therefor will be omitted.

Figure 20:
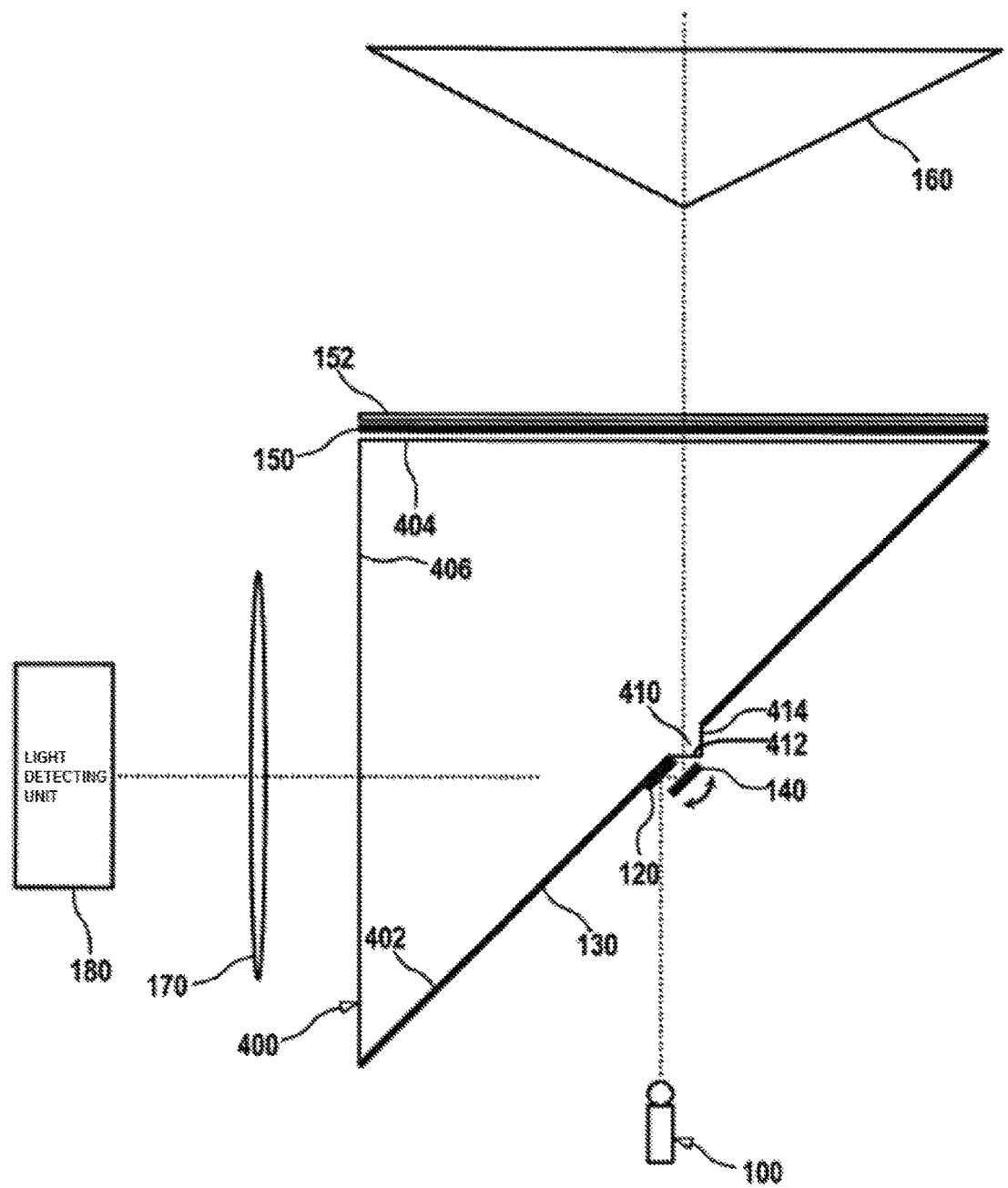
FIG. 20 is a view illustrating a configuration of a transmitting and receiving optical system of a LIDAR apparatus according to a sixth exemplary embodiment of the present invention.

FIG. 20 illustrates a LIDAR apparatus according to a sixth exemplary embodiment of the present invention.

The LIDAR apparatus according to the present exemplary embodiment includes a light source 100, a triangular prism 400 disposed above the light source 100, a light source mirror 120 and a micro mirror 140 disposed outside the inclined surface 402 of the triangular prism 400, an upper mirror 160 positioned above a first side surface 404 of the triangular prism 400, and a condensing lens 170 and a light detecting unit 180 disposed outside a second side surface 406 of the triangular prism 400. In addition, also in the present exemplary embodiment, a wide angle lens 150 and a filter 152 may be additionally provided between the triangular prism 400 and the upper mirror 160, similar to the fourth exemplary embodiment.

Since configurations and functions of the light source 100, the light source mirror 120, the micro mirror 140, the wide angle lens 150, the filter 152, the condensing lens 170, and the light detecting unit 180 are the same as or similar to those of the fourth exemplary embodiment illustrated in FIG. 14, a detailed description therefor will be omitted. In addition, the electrical components illustrated in FIG. 4 may be similarly applied in the present exemplary embodiment.

In an exemplary embodiment, the prism 400 is a triangular prism having an inclined surface 402, a first side surface 404, and a second side surface 406 and having a triangular cross section. Particularly, it is preferable that the prism 400 is a right-angle prism in which the first side surface 404 and the second side surface 406 are orthogonal to each other in order to facilitate processing and assembling of each optical component.

The inclined surface 402 of the prism 400 serves as the reception mirror 130 reflecting the received light emitted from the LIDAR apparatus, reflected by the external reflector, and then returned toward the light detecting unit 180. Although the inclined surface 402 of the prism 400 generally has sufficient reflection characteristics in itself, it is preferable that reflection coating is performed on the inclined surface 402 so that a reflection surface is directed toward an inner side of the prism 400 in order to minimize loss of light.

A protrusion part 410 protruding outward is formed on the inclined surface 402 of the prism 400. The protrusion part 410 has a source incident surface 412 that is in parallel with the first side surface 404 and a vertical surface 414 that is in parallel with the second side surface 406 and connecting an end portion of the source incident surface 412 and the inclined surface 402 to each other.

The light source mirror 120 is attached to the vicinity of an inner corner of the protrusion part 410 on the inclined surface 402 of the prism 400. The light source mirror 120 may be implemented by performing reflection coating for implementing the reception mirror 130 on the inclined surface 402 of the prism 400 and then performing reflection coating on a rear surface of the reflection coating so that a reflection surface is directed toward the outside or attaching a mirror to the rear surface of the reflection coating. The light source mirror 120 serves to reflect the source light emitted from the light source 100 toward the micro mirror 140. In the present exemplary embodiment, the light source 100 is disposed below the light source mirror 120 so that the source light is directed toward the center of the light source mirror 120.

The micro mirror 140 is installed below the source incident surface 412 of the protrusion part 410. Particularly, the micro mirror 140 is disposed to be directed between the source incident surface 412 of the inclined surface 402 of the prism 400 and the light source mirror 120 in a normal state. The micro mirror 140 re-reflects the source light reflected by the light source mirror 120 and then incident thereto to allow the re-reflected scan light to move toward the upper mirror 160 through the source incident surface 412 and the first side surface 404 of the prism 400.

In the LIDAR apparatus according to the present exemplary embodiment, transmitted light and received light move as follows.

Figure 21:
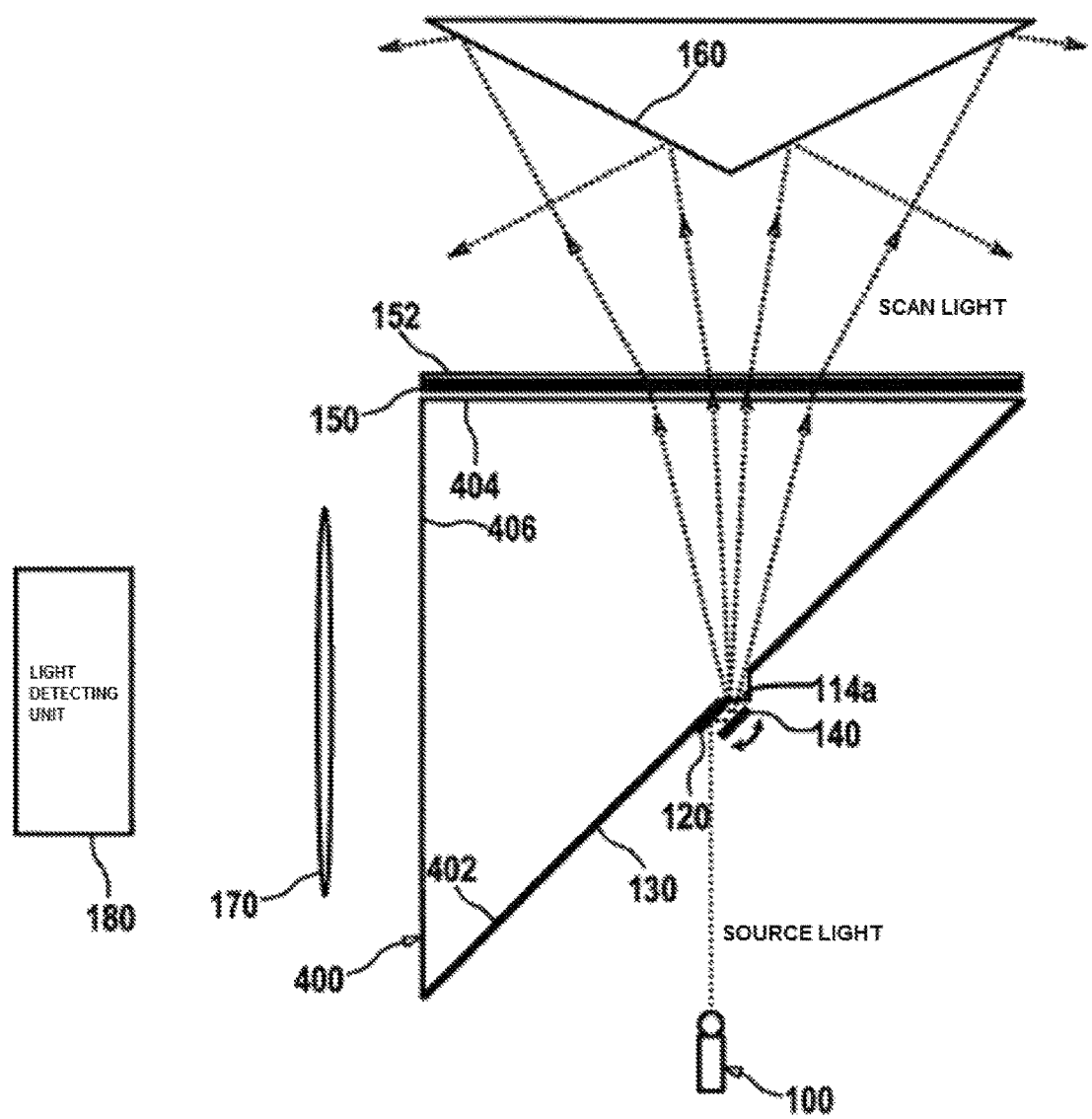
FIG. 21 is a view illustrating a light path of transmitted light in the LIDAR apparatus of FIG. 20.

As illustrated in FIG. 21, the source light emitted from the light source 100 is reflected by the light source mirror 120 and is incident to the micro mirror 140. The source light is re-reflected by the micro mirror 140 that rotates, is incident to an inner portion of the prism 400 through the source incident surface 412 of the protrusion part 410 of the prism 400, and is emitted through the first side surface 404. The scan light emitted from the prism 400 is refracted by the wide angle lens 150. The scan light refracted by the wide angle lens 150 is reflected by the upper mirror 160 to be propagated in the lateral direction or the lateral downward direction of the LIDAR apparatus.

Figure 22:
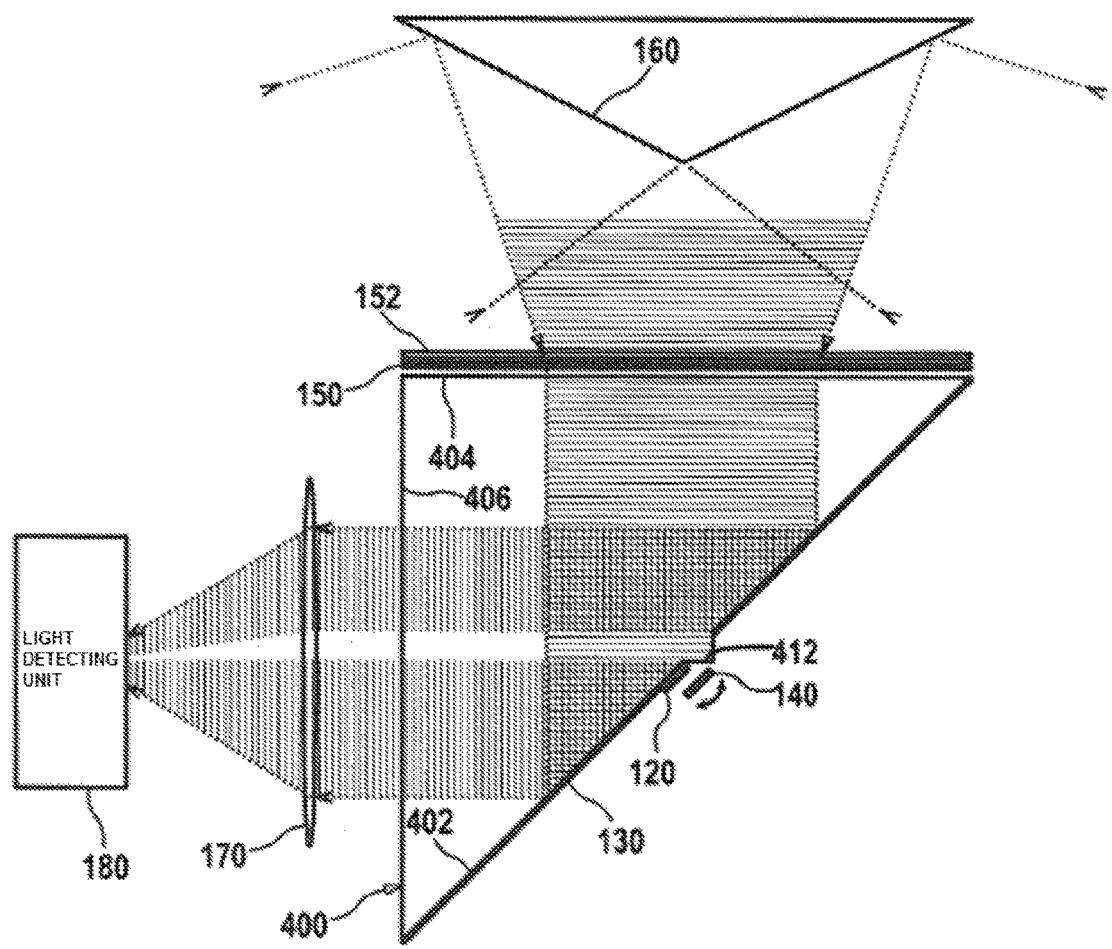
FIG. 22 is a view illustrating a light path of received light in the LIDAR apparatus of FIG. 20.

Meanwhile, as illustrated in FIG. 22, the received light reflected by the external reflector and then returned is reflected in the downward direction by the upper mirror 160, is refracted by the wide angle lens 150, and is then incident to the inner portion of the prism 400 through the first side surface 404 of the prism 400. In the inner portion of the prism 400, the received light is reflected by the inclined surface 402, is emitted through the second side surface 406, is condensed by the condensing lens 170, and is then converted into an electrical signal by the light detecting unit 180.

Since an operation and other features of the LIDAR apparatus illustrated in FIG. 20 are the same as those of the LIDAR apparatus illustrated in FIG. 14, a detailed description therefor will be omitted.

According to the optical system illustrated in FIG. 20, since the received light may not be reflected in a portion in which the protrusion part 410 of the prism 400 is formed, information on a portion corresponding to this portion may not be present in the distance map image. However, the protrusion part 410 of the prism 400 is formed at a size as small as possible in a range in which a light path is not blocked, thereby making it possible to sufficiently reduce the non-detected region as described above.

In another exemplary embodiment modified from the exemplary embodiment of FIG. 20, a groove depressed from the inclined surface 402 into the prism may also be formed instead of the protrusion part 410, which is the same as the content described above with reference to FIG. 11. That is, in the exemplary embodiment illustrated in FIG. 11, an inclined surface of 402 of the prism 400a is provided with a groove 420 depressed inward. The groove 420 has a source incident surface 422 that is in parallel with the first side surface 404 and a vertical surface 424 that is in parallel with the second side surface 406 and connecting an inner end portion of the source incident surface 422 and the inclined surface 402 to each other. Since an operation of the LIDAR apparatus adopting the prism as described above is the same as that of the LIDAR apparatus described above, a description therefor will be omitted.

Meanwhile, in still another exemplary embodiment, the prism 400 and the wide angle lens 150 illustrated in FIG. 20 may be integrated with each other, which is the same as the content described above with reference to FIG. 12. That is, in the exemplary embodiment illustrated in FIG. 12, a first side surface 444 of the prism 440 is formed as a curved surface convex outward rather than a plane surface. Therefore, the first side surface 444 serves as a convex lens. In the case of adopting the prism 440 as described above, the wide angle lens 150 does not need to be separately prepared, such that a cost required for processing the wide angle lens 150 and a man-hour for assembling and alignment of the wide angle lens 150 may be significantly decreased. Since an operation of the LIDAR apparatus adopting the prism as described above is the same as that of the LIDAR apparatus described above, a description therefor will be omitted.

In still another exemplary embodiment, the prism 400 and the condensing lens 170 illustrated in FIG. 20 may also be integrated with each other, which is the same as the content described above with reference to FIG. 13. That is, in the exemplary embodiment illustrated in FIG. 13, a second side surface 466 of the prism 460 is formed as a curved surface convex outward rather than a plane surface. Therefore, the second side surface 466 serves as a convex lens. In the case of adopting the prism 466 as described above, the condensing lens 170 does not need to be separately prepared, such that a cost required for processing the condensing lens 170 and a man-hour for assembling and alignment of the condensing lens 170 may be significantly decreased. Since an operation of the LIDAR apparatus adopting the prism as described above is the same as that of the LIDAR apparatus described above, a description therefor will be omitted.

Although preferable exemplary embodiments of the present invention have been described hereinabove, the present invention is not limited thereto, but may be variously modified and be implemented in other detailed forms without changing a technical spirit and an essential feature of the present invention.

For example, although the case in which the through-hole 132 is formed in the reception mirror 130 so that the light paths of the source light incident through the light source mirror 120 and the scan light re-reflected by the micro mirror 140 are not blocked has been described in the above description, it is sufficient to remove only a mirror coating from the reception mirror 130 instead of forming the through-hole 132, thereby allowing the light to be transmitted through the reception mirror 130.

In addition, although the case in which the micro mirror 140 is installed behind the through-hole 132 of the reception mirror 130 has been described in the exemplary embodiment described above, the micro mirror 140 may also be installed in or in front of the through-hole 132 in a modified exemplary embodiment. Particularly, in the case in which the micro mirror 140 is installed in front of the through-hole 132, a light transmitting part such as the through-hole 132 is not necessarily required. In the exemplary embodiment as described above, it is sufficient for only a power line and a signal line for the micro mirror 140 to pass through the reception mirror 130.

On the other hand, although the case in which the filter 152 is provided in front of the wide angle lens 150 or on the front surface of the wide angle lens 150 has been described in the above description, the filter 152 may also be implemented as a coating in front of the reception mirror 130 or the condensing lens 170 or on a front surface of the reception mirror 130 or the condensing lens 170 in another exemplary embodiment.

According to the present invention, since laser having a narrow beam width, emitted from a laser module is rapidly scanned and emitted in all directions within a field of view by the micro mirror that rapidly rotates, a required laser output may be significantly decreased as compared with an apparatus according to the related art simultaneously emitting the laser in all directions within the field of view.

Therefore, a manufacturing cost of the LIDAR apparatus may be significantly decreased, and a size of the laser module and an entire size of the LIDAR apparatus are significantly reduced, such that the LIDAR apparatus becomes compact. In addition, power consumption in a process of operating the LIDAR apparatus is significantly decreased depending on the decreased laser output. Further, since a light transmitting optical system and a light receiving optical system are integrated with each other, a size of the LIDAR apparatus is significantly reduced. Particularly, since only the micro mirror in the LIDAR apparatus rather than the entire LIDAR apparatus rotates, a mechanism for rotation is not required, such that the LIDAR apparatus may be manufactured at a very small size, and aesthetic of the LIDAR apparatus may be improved.

In addition, a width of a laser beam is decreased, such that an output of laser light emitted in each scanning direction may be significantly increased. Therefore, distance resolution may be significantly increased, a distance map may be precisely created, and a distance and a shape may be precisely measured.

The LIDAR apparatus according to the present invention as described above may be applied to a civilian mobile robot such as a surveillance patrol robot, a transfer robot for factory automation (FA), an unmanned ship, a civilian unmanned helicopter, or the like, and may be utilized in a smart vehicle or the future unmanned vehicle. Further, the LIDAR apparatus according to the present invention may be applied to a national defense robot such as a surveillance patrol robot, a battle robot, or the like, or a weapon system such as an unmanned surface vehicle, an unmanned helicopter, an unmanned reconnaissance drone, or the like, to improve precision of an equipment and significantly strengthen military war potential.

In addition, although various exemplary embodiments have been described hereinabove, features of the respective exemplary embodiments may be implemented to be combined with each other.

Therefore, it is to be understood that the exemplary embodiments described hereinabove are illustrative rather than being restrictive in all aspects. It is to be understood that the scope of the present invention will be defined by the claims rather than the above-mentioned description and all modifications and alterations derived from the claims and their equivalents are included in the scope of the present invention.

What is claimed is:

1. A light detection and ranging (LIDAR) apparatus comprising:
    a light source generating source light;
    a rotation mirror reflecting the source light as scan light forward while changing a direction depending on time;
    a reception mirror installed in front of the rotation mirror, reflecting received light, which is the scan light reflected by an external reflector to thereby be returned, and having a light transmitting part formed at a position facing the rotation mirror so that light paths of the source light incident to the rotation mirror and the scan light emitted from the rotation mirror are not blocked;
    a light detecting unit detecting the received light reflected by the reception mirror; and
    a calculating unit calculating a distance up to the external reflector on the basis of a time of flight from a point in time in which the source light is generated to a point in time in which the received light is detected, wherein the rotation mirror is rotatably installed in a two-axis direction on a light path of the source light, such that a direction of a reflection surface thereof is varied depending on time, and the reception mirror is installed not to be rotated, and
    the rotation mirror is installed behind the light transmitting part to allow the source light incident to the rotation mirror and the scan light emitted from the rotation mirror to move while penetrating through the light transmitting part.

2. The LIDAR apparatus of claim 1, further comprising a condensing lens condensing the received light reflected by the reception mirror,
    wherein the light detecting unit detects the received light condensed by the condensing lens.

3. The LIDAR apparatus of claim 1, further comprising a light source mirror reflecting the source light emitted from the light source toward the rotation mirror.

4. The LIDAR apparatus of claim 1, further comprising a wide angle lens installed on a movement path of the scan light and extending an angle at which the scan light is emitted.

5. The LIDAR apparatus of claim 1, further comprising a concave mirror condensing the received light reflected by the reception mirror,
    wherein the light detecting unit detects the received light condensed by the concave mirror.

6. The LIDAR apparatus of claim 5, further comprising a detector mirror reflecting the received light condensed by the concave mirror toward the light detecting unit.

7. The LIDAR apparatus of claim 6, further comprising a light source mirror reflecting the source light emitted from the light source toward the rotation mirror,
    wherein the detector mirror and the light source mirror are integrated with each other while having reflection surfaces in different directions.

8. The LIDAR apparatus of claim 5, further comprising a wide angle lens installed on a movement path of the scan light and extending an angle at which the scan light is emitted.

9. The LIDAR apparatus of claim 1, comprising a prism having an inclined surface, a first side surface disposed toward the front, and a second side surface orthogonal to the first side surface, and including a light injecting part formed on the inclined surface and having a source incident surface that is in parallel with the first side surface,
    wherein the rotation mirror is disposed outside the source incident surface, and
    an inner side surface of the inclined surface acts as the reception mirror.

10. The LIDAR apparatus of claim 9, further comprising a light source mirror installed outside the inclined surface of the prism and reflecting the source light emitted from the light source toward the rotation mirror.

11. The LIDAR apparatus of claim 9, wherein the light injecting part of the prism is formed of a protrusion part protruding outward from the inclined surface.

12. The LIDAR apparatus of claim 9, wherein the light injecting part of the prism is formed of a groove depressed from the inclined surface into the prism.

13. The LIDAR apparatus of claim 9, wherein reflection coating is performed on the inclined surface of the prism so that a reflection surface is directed toward an inner side of the prism.

14. The LIDAR apparatus of claim 9, further comprising a wide angle lens installed on a movement path of the scan light and extending an angle at which the scan light is emitted.

15. The LIDAR apparatus of claim 9, wherein at least one of the first and second side surfaces of the prism is formed as a curved surface convex outward.

16. A LIDAR apparatus comprising:
a light source generating source light;
a rotation mirror rotatably installed in a two-axis direction on a light path of the source light, such that a direction of a reflection surface thereof is varied depending on time, and reflecting the source light as scan light upward while changing a direction depending on time;
an upper mirror installed above the rotation mirror, reflecting the scan light in a lateral downward direction, and reflecting received light, which is the scan light reflected by an external reflector to thereby be returned, in a downward direction;
a light detecting unit detecting the received light;
a reception mirror installed in front of the rotation mirror, reflecting the received light reflected by the upper mirror toward the light detecting unit, and having a light transmitting part formed at a position facing the rotation mirror so that light paths of the source light incident to the rotation mirror and the scan light emitted from the rotation mirror are not blocked; and
a calculating unit calculating a distance up to the external reflector on the basis of a time of flight from a point in time in which the source light is generated to a point in time in which the received light is detected.

17. The LIDAR apparatus of claim 16, further comprising a condensing lens condensing the received light reflected by the reception mirror,
wherein the light detecting unit detects the received light condensed by the condensing lens.

18. The LIDAR apparatus of claim 16, further comprising a light source mirror reflecting the source light emitted from the light source toward the rotation mirror.

19. The LIDAR apparatus of claim 16, further comprising a wide angle lens installed between the rotation mirror and the upper mirror and extending an angle at which the scan light is emitted.

20. The LIDAR apparatus of claim 16, further comprising a concave mirror condensing the received light reflected by the reception mirror,
wherein the light detecting unit detects the received light condensed by the concave mirror.

21. The LIDAR apparatus of claim 20, further comprising a detector mirror reflecting the received light condensed by the concave mirror toward the light detecting unit.

22. The LIDAR apparatus of claim 21, further comprising a light source mirror reflecting the source light emitted from the light source toward the rotation mirror,
wherein the detector mirror and the light source mirror are integrated with each other while having reflection surfaces in different directions.

23. The LIDAR apparatus of claim 20, further comprising a wide angle lens installed between the rotation mirror and the upper mirror and extending an angle at which the scan light is emitted.

24. The LIDAR apparatus of claim 16, comprising a prism having an inclined surface, a first side surface disposed toward the upper mirror, and a second side surface orthogonal to the first side surface, and including a light injecting part formed on the inclined surface and having a source incident surface that is in parallel with the first side surface,
wherein the rotation mirror is disposed outside the source incident surface, and
an inner side surface of the inclined surface acts as the reception mirror.

25. The LIDAR apparatus of claim 24, further comprising a light source mirror installed outside the inclined surface of the prism and reflecting the source light emitted from the light source toward the rotation mirror.

26. The LIDAR apparatus of claim 24, wherein the light injecting part of the prism is formed of a protrusion part protruding outward from the inclined surface.

27. The LIDAR apparatus of claim 24, wherein the light injecting part of the prism is formed of a groove depressed from the inclined surface into the prism.

28. The LIDAR apparatus of claim 24, wherein reflection coating is performed on the inclined surface of the prism so that a reflection surface is directed toward an inner side of the prism.

29. The LIDAR apparatus of claim 24, further comprising a wide angle lens installed between the first side surface and the upper mirror and extending an angle at which the scan light is emitted.

30. The LIDAR apparatus of claim 24, wherein at least one of the first and second side surfaces of the prism is formed as a curved surface convex outward.

31. The LIDAR apparatus of claim 16, wherein the upper mirror is a mirror having a cone shape of which a vertex is positioned at a lower portion.

32. The LIDAR apparatus of claim 16, wherein the upper mirror is a convex mirror of which a reflection surface is convex downward.

33. The LIDAR apparatus of claim 31, wherein the upper mirror has a symmetrical shape so as to have the same reflection angle characteristics in all horizontal directions.

34. The LIDAR apparatus of claim 32, wherein the upper mirror has a symmetrical shape so as to have the same reflection angle characteristics in all horizontal directions.

35. The LIDAR apparatus of claim 31, wherein the upper mirror has an asymmetrical shape so as to have different reflection angle characteristics in at least some of all horizontal directions.

36. The LIDAR apparatus of claim 32, wherein the upper mirror has an asymmetrical shape so as to have different reflection angle characteristics in at least some of all horizontal directions.

* * * * *